(12) United States Patent
Warburton et al.

(10) Patent No.: US 6,732,059 B2
(45) Date of Patent: May 4, 2004

(54) ULTRA-LOW BACKGROUND GAS-FILLED ALPHA COUNTER

(75) Inventors: William K. Warburton, 1300 Mills St., Menlo Park, CA (US) 94025; John Wahl, Fremont, CA (US); Michael Momayezi, Fremont, CA (US)

(73) Assignee: William K. Warburton, Menlo Park, CA (US)

( * ) Notice: Subject to any disclaimer, the term of this patent is extended or adjusted under 35 U.S.C. 154(b) by 0 days.

(21) Appl. No.: 09/938,136

(22) Filed: Aug. 23, 2001

(65) Prior Publication Data

US 2003/0040877 A1 Feb. 27, 2003

(51) Int. Cl.[7] .............................................. G06F 19/00
(52) U.S. Cl. .......................... 702/78; 702/78; 702/126; 702/189; 702/198; 250/264; 250/269.2; 250/266; 378/119; 378/124; 330/41; 330/308; 257/297
(58) Field of Search ............................... 702/69–71, 78, 702/79, 124, 126, 189, 198, FOR 103, 104, 109, 110, 133, 134, 170, 171; 250/264, 269.2, 269.7, 265, 266, 559.12, 559.46; 378/2, 5, 119, 124, 134; 330/41, 308; 257/297

(56) References Cited

U.S. PATENT DOCUMENTS

| | | | |
|---|---|---|---|
| 3,721,825 A | | 3/1973 | Rasmussen, Jr. |
| 3,869,608 A | * | 3/1975 | Scherbastskoy ............. 250/270 |
| 4,104,523 A | * | 8/1978 | Wolfert .................. 250/370.02 |
| 4,317,038 A | * | 2/1982 | Charpak ...................... 250/385 |
| 5,059,803 A | | 10/1991 | Kronenberg |
| 5,187,727 A | * | 2/1993 | Vogler et al. .................. 378/50 |
| 5,192,868 A | * | 3/1993 | Dudley .................... 250/385.1 |
| 5,873,054 A | | 2/1999 | Warburton .................. 702/190 |

OTHER PUBLICATIONS

Kyoto et al., Lecture Notes in Physics, Springer–Verlag, 1982, Edition 178, pp. 26–43.*
Marven et al., A Simple Approach to Digital Signal Processing, Wiley Interscience, 1996, pp. 53–58.*
Berkley University, Silicon Semiconductor Detectors, Sep. 2000, UCBC, pp. 1–9.*

(List continued on next page.)

*Primary Examiner*—Marc S. Hoff
*Assistant Examiner*—Elias Desta
(74) *Attorney, Agent, or Firm*—Townsend and Townsend and Crew LLP

(57) ABSTRACT

A method and counter for reducing the background counting rate in gas-filled alpha particle counters wherein the counter is constructed in such a manner as to exaggerate the differences in the features in preamplifier pulses generated by collecting the charges in ionization tracks produced by alpha particles emanating from different regions within the counter and then using pulse feature analysis to recognize these differences and so discriminate between different regions of emanation. Thus alpha particles emitted from the sample can then be counted while those emitted from the counter components can be rejected, resulting in very low background counting rates even from large samples. In one embodiment, a multi-wire ionization chamber, different electric fields are created in different regions of the counter and the resultant difference in electron velocities during charge collection allow alpha particles from the sample and counter backwall to be distinguished. In a second embodiment, a parallel-plate ionization chamber, the counter dimensions are adjusted so that charge collection times are much longer for ionization tracks caused by sample source alpha particles than for those caused by anode source alpha particles. In both embodiments a guard electrode can be placed about the anode's perimeter and secondary pulse feature analysis performed on signal pulses output from a preamplifier attached to this guard electrode to further identify and reject alpha particles emanating from the counter's sidewalls in order to further lower the counter's background.

74 Claims, 10 Drawing Sheets

OTHER PUBLICATIONS

IICO–1999: "Model 1950 Ultra Low Background Alpha Counting System," Product Literature (IICO/Spectrum Sciences, Saratoga, CA, 1999), pp. 1–2.

ITRS–1999: "International Technology Roadmap for Semiconductors, 1999 Edition," (SEMATECH, Austin, TX 1999), p. 235.

KNOLL–1989: "Radiation Detection and Measurement, 2nd Ed." by Glenn F. Knoll (J. Wiley, New York, 1989), pp. 131–159 (Chapter 5); pp. 160–198 (Chapter 6); pp. 724–725.

ORTEC–1998: "Introduction to Charged–Particle Detectors," EG&G Ortec 97/98 Catalog "Modular Pulse–Processing Electronics and Semiconductor Radiation Detectors" (EG&G Ortec, Oak Ridge, TN, 1998), pp. 1.8–1.16.

Browne, M.C. et al., Low–background $^3$He Proportional Counters for Use in the Sudbury Neutrino Observatory, IEEE Transactions on Nuclear Science, vol. 46 (4), Aug. 1999, pp. 873–876.

* cited by examiner

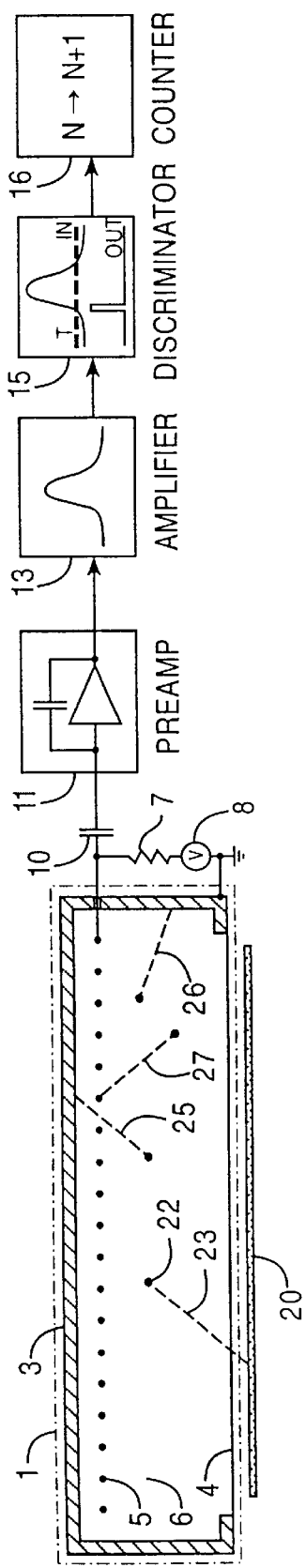
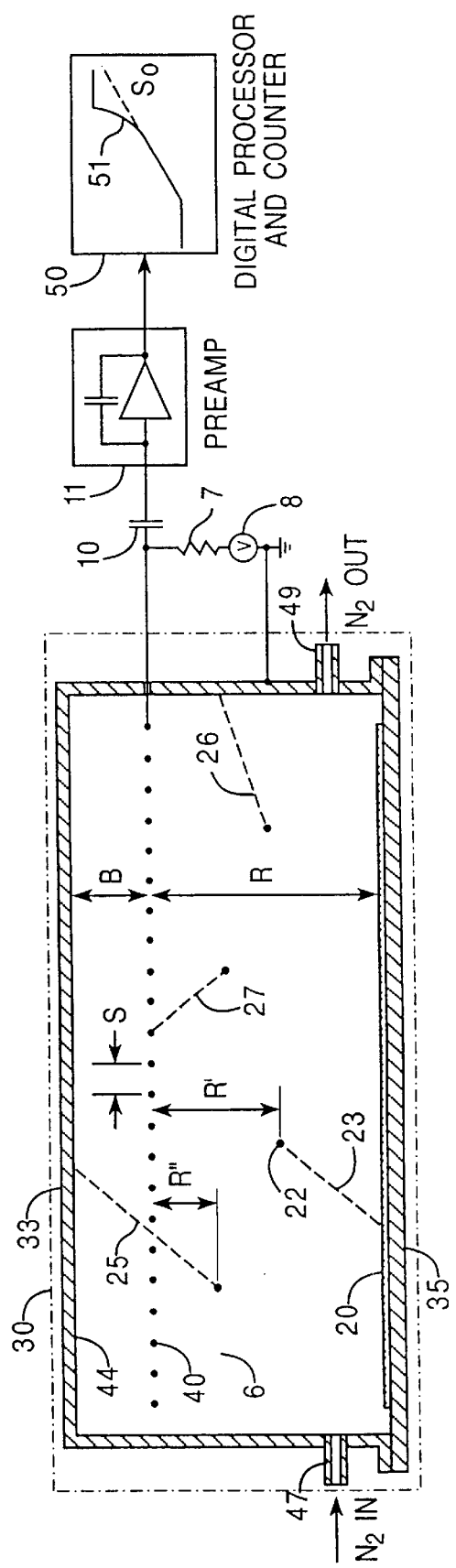

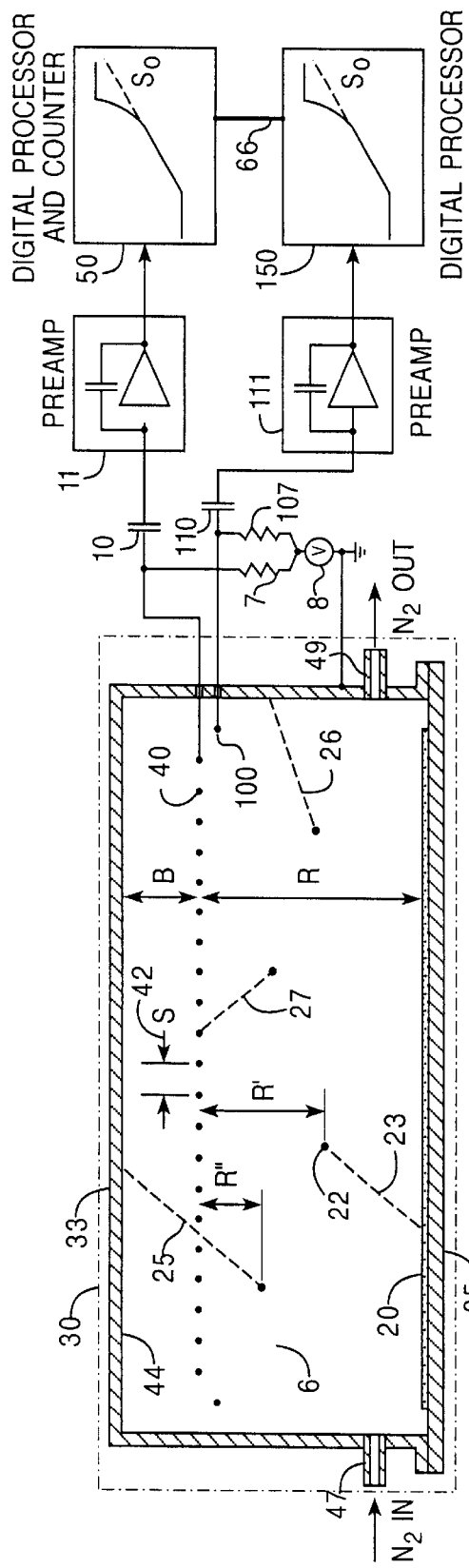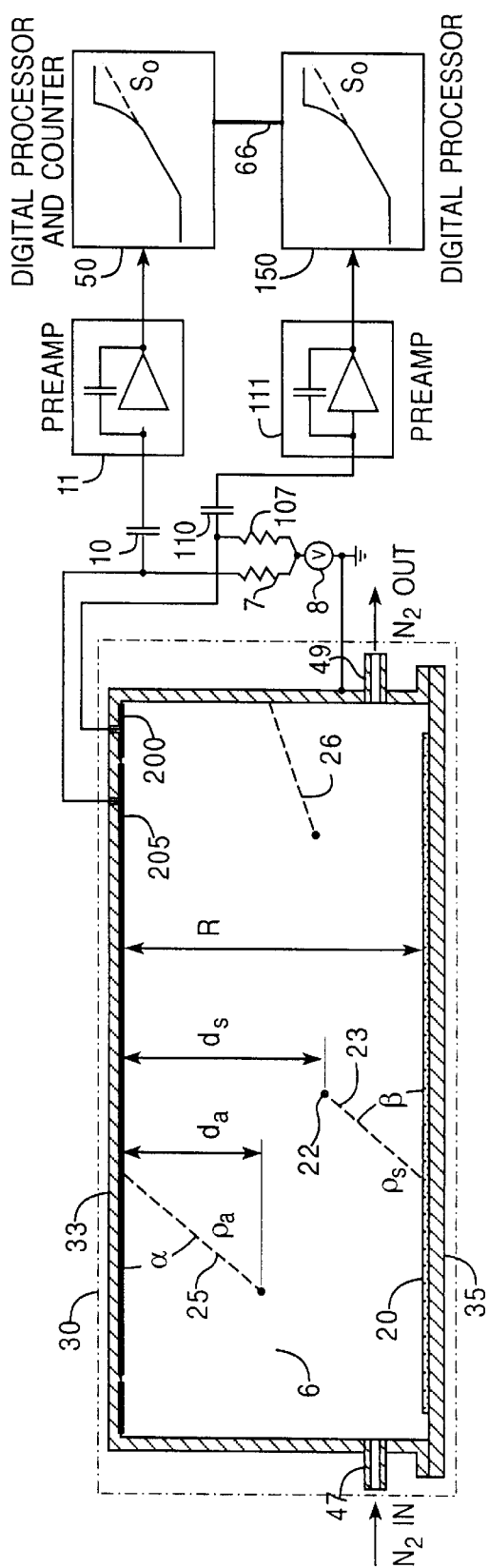

ULTRA-LOW BACKGROUND GAS-FILLED ALPHA COUNTER

BACKGROUND OF THE INVENTION

The present invention relates generally to systems for detecting and counting nuclear particles, and more particularly to counting such particles while reducing the background counting rate in gas-filled particle counters. The specific embodiments described relate to reducing background counting rates in both multi-wire counters and ionization chambers used to detect and count alpha particles, but the same techniques could be applied to counting other charged particles as well.

1. The Need for Low Background Alpha Counting

Low background alpha particle counting is important in various fields where very low concentrations of activity must be detected. Two important examples are in the testing of environmental samples and the specification of materials for the electronics industry. Data in the former case are used for such purposes as tracing radioactive emissions in the environment and estimating long term dosages to humans. In the latter case, materials which will be in intimate contact with silicon digital processing and/or storage chips must have low alpha particle emissions since these emissions can create charges within the chips that can change the values of digital numbers stored there and so introduce errors in computed or stored values.

A particular example of this is the need for low alpha lead. In presently used high density packaging technologies, silicon chips are often directly soldered to a mounting substrate using ball grid arrays or related soldering technologies. In this case the lead in the solder is in intimate contact with the silicon chip and so must have low alpha emissions for the chips to function reliably. For the next generation of high density circuits, it has been stated that:

"Measurement techniques and standards for alpha radiation effects are not adequate to support the increased alpha sensitivity anticipated for advanced technology processes." [ITRS-1999, Assembly & Packaging, pg 235]

2. Current State of the Art

There are two major techniques presently used to measure alpha particle emission: gas-filled counters and silicon spectrometers. At this point, the two have similar background counting rates, but for different reasons.

Gas-Filled Counters

To set the context of the present invention, we briefly review the operation of, and distinction between, gas-filled ionization and proportional counters, as understood by those skilled in the art. A more comprehensive presentation can be found in Knoll. [KNOLL-1989, Chapters 5 & 6]. Ionization chambers are simply gas-filled volumes fitted with electrodes so that an electric field can be applied to the volume and any charges generated therein collected. When an alpha particle traverses the gas and loses energy, it produces an ionization track, composed of gas ions and the electrons knocked off them. The more massive ions drift slowly toward the negative cathode, while the lighter electrons drift toward the positive anode about 1000 times more quickly. [KNOLL-1989, pp. 131–138]. In simple ion chambers only the total collected current is measured, which is proportional to the average rate of ion formation within the chamber. Ion chambers can also be operated as counters in pulse mode, where the currents induced in the anode by the drifting electrons are amplified and integrated so that each ionization track produces a single output pulse and is counted individually. [KNOLL-1989, pp. 149–157] However, since the induced currents flow for the full electron drift time, the amount of integrated charge produced by a track varies, depending upon its starting location within the counter. Frisch grids, whose operation is beyond the scope of this discussion, can be used to minimize this effect. In general, since detector capacitances are large and the total amounts of ionization charge produced are low, signal-to-noise is poor when ionization chambers are operated in pulse detection mode.

Proportional counters seek to increase signal-to-noise, compared to ionization chambers, by using gas avalanche gain to increase the number of charges produced. Avalanching occurs when the average amount of energy a drifting electron acquires between successive collisions with gas molecules is larger than their ionization energy. Then, on average, each collision produces a second electron and the number of electrons increases exponentially with distance. Provided the total avalanche distance is strictly limited, the final number of electrons will be strictly proportional to the starting number, but many times larger. Very large electric fields are required for avalanche multiplication to occur, of order 1 to $10 \times 10^6$ V/m, which are usually produced by applying a voltage of order 1 to 2 KV to a wire whose diameter is typically 0.02 to 0.08 mm in radius (0.001" to 0.003"). Since the electric field falls of inversely proportionally to the distance from the wire's center, avalanching can occur only within about 100 microns of the wire's surface which, in turn, provides the limitation required to assure gain proportionality. [KNOLL-1989, pp. 160–165] Further, because essentially all the avalanche charge is produced close to the wire, there are no drifting electron induced charge effects in proportional counters, so that output pulse amplitude and charge are proportional to the initial charge in the ionization track, independent of its original location within the counter. Proportional counters are commonly operated in single pulse counting mode. [KNOLL-1989, pp. 180–185] Because the avalanche process is very fast, it lasts only as long as the ionization track arrives at the anode wire. In a well designed counter, this time is short compared to the time it takes the ions formed in the avalanche to drift away from the anode wire, typically a few microseconds. As it is this latter process that induces the detector's output signal current in the anode, all output pulses in such well designed detectors have approximately the same shape.

The current state of the art in low background alpha counting uses a multi-wire gas-filled proportional counter with an ultra-thin entrance window. These counters can achieve sensitivities of about 0.05 $\alpha/\text{cm}^2/\text{hr}$. [IICO-1999] They are typically constructed as shown in FIG. 1. The detector 1 includes a conducting chamber 3 sealed on one side with an ultra-thin window 4. A grid of anode wires 5 is suspended next to the chamber wall opposite the entrance window. The entire volume is filled with a counting gas 6. The anode is biased via a large value resistor 7 connected to a voltage source 8 and also connected via a capacitor 10 to a charge sensitive preamplifier 11. The preamplifier output connects to a shaping amplifier 13 and then to a discriminator 15 and counter 16. The sample 20 is placed close to the entrance window 4 and emits alpha particles into the chamber. The window 4 thus defines a sample region, namely a region of the chamber volume at or near which a sample is to be located. In other chambers, the sample may be located within the chamber, in which case the chamber structure that supports the sample would help define the sample region.

A specific alpha particle 22 is shown. This particle creates an ionization track 23 in counting gas 6. These charges drift toward the anode 5, where they are amplified by the high electric field in the vicinity of the wires and then collected. [KNOLL-1989, pp. 160–165] The resultant charge signal is integrated by the preamplifier 11, resulting in a pulse being output from the shaping amplifier 13. When discriminator 15 senses this pulse crossing a preset threshold T, it emits a short output pulse which is then counted by the counter 16.

However, in addition to ionization tracks generated by alpha particles such as alpha particle 22 emitted from the sample 20, ionization tracks 25, 26, and 27 also are generated by alpha particles emitted from the chamber backwall, sidewall, and anode wires. Because the preamplifier/amplifier pulses generated by these ionization tracks cannot be distinguished from those arising from sample-source alpha particles, these counts contribute to the detector's background counting rate. In the current state of the art, this background counting rate is reduced significantly by constructing all of the counter's components from materials having very low alpha emissivity. This approach not only adds significantly to the difficulty and expense of constructing such counters, but becomes exponentially more difficult as ever lower backgrounds are sought. After 20 years of development, the approach appears to have reached its natural limits.

This type of gas-filled counter has the advantage that, being filled with a low density gas, it is relatively insensitive to background radiation arising from environmentally generated gamma rays and also to most cosmic rays, which are energetic muons. These counters can also be made quite large, with commercial units up to 30 cm by 30 cm being common. Beyond its inability to distinguish alpha particle sources, the counter's disadvantages include operational difficulties associated with the ultra-thin windows required to efficiently emit alpha particles and the sensitivity of the anode wires to microphonic pickup. Used as spectrometers, their energy resolution is poor, being 8–10% or worse.

Silicon Alpha Spectrometers

Silicon alpha spectrometers are large area Si PIN diode detectors which are biased and connected to a charge sensitive preamplifier and amplifier much as is the counter shown in FIG. 1. The major difference is that no amplification is involved: the charges generated within the Si by alpha particles are simply collected and amplified. The lack of anode wires greatly reduces microphonics and the energy required to produce a free electron in Si is about 10 times smaller than in the counting gas, so that the statistics of charge generation are much better. Energy resolutions of 1–2% can readily be obtained from such detectors. The irreducible background in these detectors is set by cosmic radiation: since the density of Si is much higher than that of counting gas, significant charge is deposited, detected and counted. With 100 $\mu$m depletion depth and very careful detector design, this limit can also be reduced to about 0.05 $\alpha$/cm$^2$/hr. [ORTEC-1998] These detectors are preferred when it is desirable to identify the source of the alpha particles by measuring their emitted energies.

The major advantages of silicon alpha spectrometers are their good energy resolution and relative robustness. They have two major limitations. First, it is not practical to make them in large areas, both because their capacitance becomes too large and spoils their energy resolution, and because the high quality Si required is not available in large areas. The second is the need, in low activity work, to process the sample to extract and collect all of its radioactivity (preferably with 100% efficiency) into a small source spot which can be presented to the detector. This renders these detectors impractical for measuring unprocessed or in situ samples and also adds a large overhead to measurement costs.

Related Art

The field of nuclear particle counting is highly developed, with many variations on the two counting methods described above.

SUMMARY OF THE INVENTION

The current state of the art in reducing background counting rates in gas-filled alpha counters or spectrometers is best described as "passive" in that it seeks to reduce background rates solely by the method of building the counters using materials with extremely low alpha emissivities. In contrast, the present invention provides "active" techniques of operating these same devices so as to achieve significant reductions in background counting rates.

The present invention employs a gas-filled alpha counter that includes a gas-filled chamber having a sample region, an anode, a preamplifier connected to the anode, and a voltage source that applies a bias such that, whenever an ionization track is generated by an alpha particle passing through the gas within the chamber, the electrons in the track are collected by the anode and cause the preamplifier to produce an output signal pulse. The output pulse is associated with the alpha particle and is characteristic of the electron collection process. Thus, both the ionization track and the resultant pulse associated with a given alpha particle can be considered to have an associated region of emanation that corresponds to the region within the chamber where the ionization track originates. A minor distinction exists between our uses of regions of emission and emanation. Region of emission refers to the place where the alpha particle departed from its source. Region of emanation refers to the place where the ionization track begins within the chamber. If the source lies within the chamber the two regions are the same. If the source is external to the chamber, as in the case of alpha particle 22, then the two regions are separated slightly.

The inventive method of operating such a gas-filled alpha counter includes, for at least some pulses, measuring one or more features of the pulse that differ depending on the pulse's region of emanation, and determining, based on the measurement of the one or more features, the pulse's region of emanation. Thus the counter circuitry can be considered to include a primary feature analyzer that measures the one or more features and determines information about the pulse's region of emanation.

Thus, it is possible to discriminate between alpha particles emitted from the sample and "background" alpha particles emitted from other surfaces within the counter. Based on this discrimination, a pulse can be classified as background if it is determined that the associated alpha particle did not emanate from the sample region. Pulses classified as background can then be rejected, thereby effectively reducing background counting rates.

The features that can be used in performing the pulse analysis include: pulse amplitude, duration (closely correlated with collection time), slope, slope divided by amplitude, risetime, and time of arrival, used individually or in combination.

While these techniques can be applied to some existing chambers, in preferred embodiments, the invention contemplates constructing an alpha counter in a manner that exaggerates differences between preamplifier pulse features that result from collecting the ionization tracks generated by alpha particles emanating from different regions within the counter and then recognizing these differences in order to discriminate between the different regions of emanation. In this way, alpha particles from the sample can be counted, while alpha particles emitted from counter components can be identified, and possibly be rejected, resulting in a very low background counting rate, even from large counters.

Two primary approaches are employed in creating and exaggerating these pulse feature differences: first, creating different electric collection fields in different regions of the counter so electron velocities are different; and second, adjusting the counter dimensions so that charges from different regions not only take different amounts of time to be collected, but also generate different amount of induced charge in the output. In a preferred implementation, we digitize the output pulses and use digital signal processing techniques to produce the required discriminations. Using similar methods, the same discriminations can also be achieved using analog signal processing techniques.

Two specific embodiments are described to demonstrate the relevant principles. The first embodiment is a multi-wire, gas-filled counter, wherein the grid of anode wires is placed much closer to the counter backwall than to the sample wall or entrance window and is operated without gain (i.e., in ionization chamber mode) so that it is sensitive to the flow of induced charges as ionization tracks are collected. This geometric asymmetry makes the electric field in the region between the anode and the backwall much larger than the field between the anode and the sample. As they are collected, therefore, ionization tracks emanating from backwall alpha activity induce charge signals with much faster risetimes than the signals induced by ionization tracks emanating from sample wall alpha activity. Overall collection times for backwall ionization tracks are also much shorter than for sample ionization tracks, and this difference may be used as a secondary discriminator between these two sources of activity.

The second embodiment is an ionization chamber whose dimensions are adjusted so that drift lengths for collecting sample ionization tracks are much larger than drift lengths for collecting ionization tracks emitted from the backwall anode. This causes the sample track collection times to be much longer than anode track collection times, allowing them to be discriminated. Because their drift lengths are longer, sample tracks will also generate larger total induced charges, allowing signal slope, and particularly initial signal slope, divided by total induced charge to be used as a secondary discriminator in this case.

These embodiments allow reliable discriminations to be made between ionization tracks generated by the sample and ionization tracks generated by the counter backwall, which is usually its largest surface area, as well as from the anode collector wires, if any. Ionization tracks emitted from the counter sidewalls, however, are more difficult to identify by these techniques. These tracks can be reliably identified and rejected in either embodiment by the additional use of guard collectors, which are placed about the perimeter of the anode plane, parallel to it, and both close to it and close to the sidewalls as well. These guard collectors are biased at a potential close to that of the anode and connected to a second preamplifier similar to the anode's preamplifier. Charges in ionization tracks emanating from the sidewalls are then collected on these guard collectors, producing output pulses from the attached preamplifier. The features of these pulses can then be analyzed (by a secondary feature analyzer) to identify them as emanating from the sidewalls. The simplest feature for this purpose is time of arrival: when operated in anti-coincidence with the anode, these guard collectors reliably reject sidewall source alpha emissions so that only sample source alpha particles are finally counted. Applying a further analysis of the energy in the guard collector pulses increases the efficiency with which sample source alpha particles emanating close to the edges of the sample can be reliably identified.

Applying these active methods to alpha particle counters fabricated with such common materials as lucite and copper tape allows backgrounds to be achieved that are two or more orders of magnitude lower than are obtained in state of the art counters fabricated using only passive background reduction techniques. Additional background count rate reduction can be achieved by combining these active particle source recognition techniques with the passive use of very low alpha emission counter construction materials, as in existing designs. In particular, we consider the use of highly purified, semiconductor grade silicon, although other highly purified materials are also available and could also be used effectively.

A further understanding of the nature and advantages of the present invention may be realized by reference to the remaining portions of the specification and the drawings.

BRIEF DESCRIPTION OF THE DRAWINGS

FIG. 1 shows a diagram of a prior art multi-wire gas-filled proportional counter and its associated electronics processing chain;

FIG. 2 shows a diagram of an embodiment of the invention as a gas-filled multi-wire ionization chamber attached to a preamplifier and a digital signal processor and counter;

FIG. 7 shows a diagram of a preferred embodiment of the invention wherein guard electrodes have been added to the gas-filled multi-wire ionization chamber shown in FIG. 2;

FIG. 10 shows an embodiment of the invention as a gas-filled parallel-plate ionization chamber with guard electrodes added surrounding its anode;

DESCRIPTION OF SPECIFIC EMBODIMENTS

1. Introduction

Figure 3:
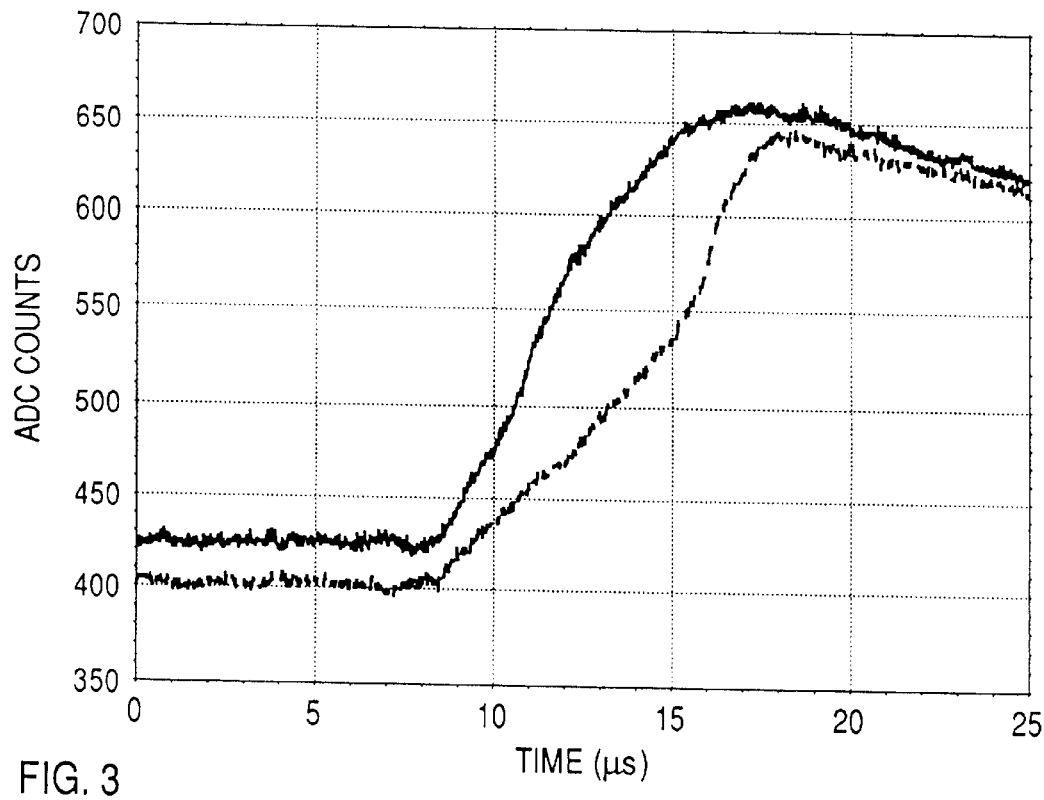
FIG. 3 shows preamplifier output traces of charge signals induced on the anode during the collection of two ionization tracks emitted from the sample wall of the detector shown in FIG. 2.

The invention exploits the differences in preamplifier pulse features that result from collecting ionization tracks generated by alpha particles emitted from different surfaces within the counter, and uses pulse feature analysis to recognize these differences and so distinguish between alpha particles emitted from the sample and "background" particles emitted from the surfaces of the counter itself.

As a matter of nomenclature, we will use the term "region of emanation" to denote the region within the chamber volume where the ionization track originates. Thus, when an alpha particle is emitted from the sample lying outside the chamber, the region of emanation would be where the alpha particle enters the chamber, e.g., window 4 in FIG. 1. If the sample is inside the chamber, the region of emanation is the sample itself. As mentioned above in connection with the description of the counter of FIG. 1, the sample region is the region of the chamber volume at or near which a sample is to be located. In both cases, the ionization track within the chamber would be considered to have a region of emanation corresponding to the sample region. Conversely, if the alpha particle emanates from other surfaces of the chamber, such as a sidewall, the region of emanation would be the sidewall region.

While strictly speaking it is the alpha particle itself that emanates from the sample region or from another surface of the chamber, it is convenient to refer to the region of emanation as being associated with the pulse that results from collecting the charge from the ionization track generated by the alpha particle. Thus, we will sometimes refer to the pulse as being characterized by or having a region of emanation; this is merely a shorthand for the region where the alpha particle's ionization track originated in the chamber.

While this analysis can be used with some existing chambers, it is preferred to construct, provide, or operate a gas-filled counter in such a manner as to exaggerate the degree that the preamplifier pulse features differ as a function of the region of particle emanation. The pulse feature analysis is then even better able to recognize these differences and so distinguish between alpha particles emitted from the sample and "background" particles emitted from the surfaces of the counter itself.

To illustrate the method, we describe two preferred embodiments: a multi-wire counter and a parallel-plate design. In both cases we: first, describe the construction of the counter; second, give a brief theoretical discussion of the expected pulse features from different counter surfaces; third, present traces of signals taken from such a design; fourth, describe the signal analysis methods that can be applied to distinguish between them; and, fifth, present a spectrum of sorted counts from the counter, showing how the method works in practice.

A secondary technique, using guard electrodes, further reduces background counting rates by identifying and eliminating counts from the chambers' sidewalls, and this method is described for both preferred embodiments. Tertiary methods to further enhance the performance of the parallel-plate design by increasing the uniformity of its electric field, reducing the capacitance of its anode, and employing low alpha emitter construction materials are also described.

Finally, we briefly consider issues associated with the operation of the detectors, including operating gas, atmospheric radon, sample placement, and the identification of other rare events.

The description below is organized as follows. §2 presents the multi-wire gas-filled counter, including the guard wire enhancement. §3 presents the parallel-plate design, including guard electrode and other enhancements. §4 discusses detector operational issues.

2. Multi-Wire Gas-Filled Detector Embodiment

2.1. Detector Description

FIG. 2 shows an embodiment of the invention as a multi-wire counter 30 comprising a manifold 33 sealed by a plate 35 upon which the same sample 20 as in FIG. 1 rests. In this embodiment, the sample is therefore within the counter volume. An anode 40 of multiple wires separated by distance S is physically similar to the anode of FIG. 1 with the following important distinctions. First, the anode wire diameter is 5 to 10 times larger (e.g. 0.40 mm) so that, at operating voltage, the counter operates in the ionization chamber mode and not in proportional counter mode. This assures that the charges induced upon the anode by ionization tracks drifting within the chamber will constitute the total anode signal generated and thus simplify their identification, compared to the proportional counter case, where most of the signal is generated in the vicinity of the anode wires and is thus insensitive to the ionization track's origin. Secondly, the anode 40 is placed within manifold 33, and the manifold is sized appropriately, so that the distance B to the backwall 44 is significantly smaller, typically one third to one fourth, than the distance R to the sample wall 20 (i.e. the wall upon which the sample rests or is mounted). B is further sized so it is a significant fraction, typically one third to one half, of the length of the ionization track 25 generated by the most energetic alpha particle expected from the backwall 44. R is similarly sized so that it is significantly longer, typically 25–30%, than the length of the ionization track 23 generated by the most energetic alpha particle expected from the sample. We note that, while conventional detectors may sometimes be similarly dimensioned, they are not so designed with the express intention of producing different charge collection times for particles originating from different locations within the chamber. The chamber is operated in flow mode, with connections 47 and 49 allowing the entrance and departure of the operating gas, shown here as nitrogen.

The bias scheme and preamplifier for the counter of FIG. 2 are identical to those used with the detector of FIG. 1, and are identically numbered. In our preferred implementation, the amplifier 13, discriminator 15, and counter 16 of FIG. 1 are replaced by a digital processor and counter 50 although, as will be shown, analog pulse feature analysis methods can be used as well.

2.2. Ionization Chamber Operating Mode

As noted above, the counter is operated in ionization chamber mode, with the applied voltage V provided by voltage generator 8 chosen so that charge collection times over the distance R lie in the few tens of microsecond range and the diameter of the anode 40 wire is then chosen so that no charge multiplication occurs in its vicinity. Because no charge multiplication occurs, quenching behavior is not required in the operating gas.

The difference between lengths B and R is important to the operation of the chamber. As is well known, the drift velocity of electrons in a gas at low electric fields is proportional to the electric field, which scales as applied voltage divided by distance. Since transit time is proportional to distance divided by velocity, transit times therefore scale as distance squared divided by applied voltage. If the ratio of R to B is, for example, three, then the time required for a charge to move from the surface of the sample 20 to the anode 40 will be nine times as long as the transit time from the chamber backwall 44 to the anode. By requiring the former to be a few tens of microseconds, the latter will be only a few microseconds, a significant difference.

As is well known, the fields in wire chambers are not uniform. In the present design, where the separation S between wires in the anode 40 are relatively small, of order 10%, compared to the distance R, the electric field will be uniform over a considerable fraction of R, becoming non-uniform only within distances comparable to S from the anode. In this region the electric field lines cease to be parallel, but bend in to meet the individual wires. Within a few wire diameters of the anode wires the field strength also increases significantly.

2.3. Signal Descriptions

Sample Source Signals

An alpha particle 22 emitted from the sample 20 creates an ionization track 23 which ends a distance R' from the anode 40, where R' is always larger than zero by design, the chamber dimension R being set to exceed the maximum expected ionization track length. While this charge drifts in the uniform field, it will induce a linearly increasing charge on the anode. As the charge approaches the anode wires and is collected, however, the signal shape and features become more difficult to predict on a general basis. As individual electrons fall through the increased field near the anode wires, their rate of inducing charge on the anode will increase. Once they are collected, they cease to induce any further charge. Whether the net effect, integrated over the entire charge track then causes an upward signal curvature, as shown in the trace 51 in FIG. 2, or a downward curvature as charge collection completes then depends in detail about the length of the track, its angle to the sample, the spacing of the anode wires, and the applied voltage.

From the point of view of identifying the track as originating from the sample, however, a detailed feature description is not required, since all signals generated by tracks emanating from the sample wall will share two characteristics. First, the total charge collection time is essentially invariant for all sample source tracks and is given by the time it takes charge to migrate the full distance R from the sample to the anode, since every alpha emanating from the sample creates some track charge immediately next to the sample surface. Second, their initial slope, before charge collection commences, will be proportional to the field on the sample wall side of the anode, which is lower than the field on the backwall side of the anode by a factor of about ten. Since initial slope is also proportional to the amount of charge in the track, the initial slope can be divided by the total charge collected in the signal trace to leave only the electric field dependence. This step becomes important when the range of alpha particle energies present within the chamber becomes large enough so that the smallest backwall initial slope (the product of the smallest backwall track charge times the backwall electric field) overlaps the largest sample wall initial slope (the product of the largest sample charge times the sample wall electric field) and the simple slope measurement can no longer unambiguously resolve the source of an ionization track in all cases.

FIG. 3 shows two sample source alpha traces from a multi-wire counter which had B and R values of 1.5 cm and 3.5 cm, respectively. While this ratio is less than ideal, compared to the specifications of FIG. 2, it is still adequate for the purpose. A small Am-241 alpha source was placed within the chamber at the center of the sample region and traces were recorded using a digital signal processor with trace capture capability, the XIA DGF-4C, available from X-Ray Instrumentation Associates, located in Newark, Calif. The two traces have significantly different shapes, per the discussion of the previous paragraphs. However, their total charge collection times are identical, about 8.0 $\mu$s, and their initial slopes are comparable, being about 25 charge units/$\mu$s.

Backwall Source Signals

An alpha particle emitted from the backwall 44 creates an ionization track 25 which ends a distance $R^\sim$ from the anode 40, where $R^\sim$ may be either positive or negative, depending upon the total track length and its angle of emission from the backwall. Initial charge collection will be much faster for these signals, both because the field in the backwall region is much higher and because any ionization track charge in the vicinity of the anode wires will also be collected rapidly due to the high fields in this region. Only the charge deposited well into the source-side volume will be initially collected more slowly and, by construction, this amount of charge is limited. The maximum observed collection times for backwall signals will occur from tracks that penetrate maximally into the source side volume and, by construction, these times will always be less than about half of source side collection times.

Figure 4:
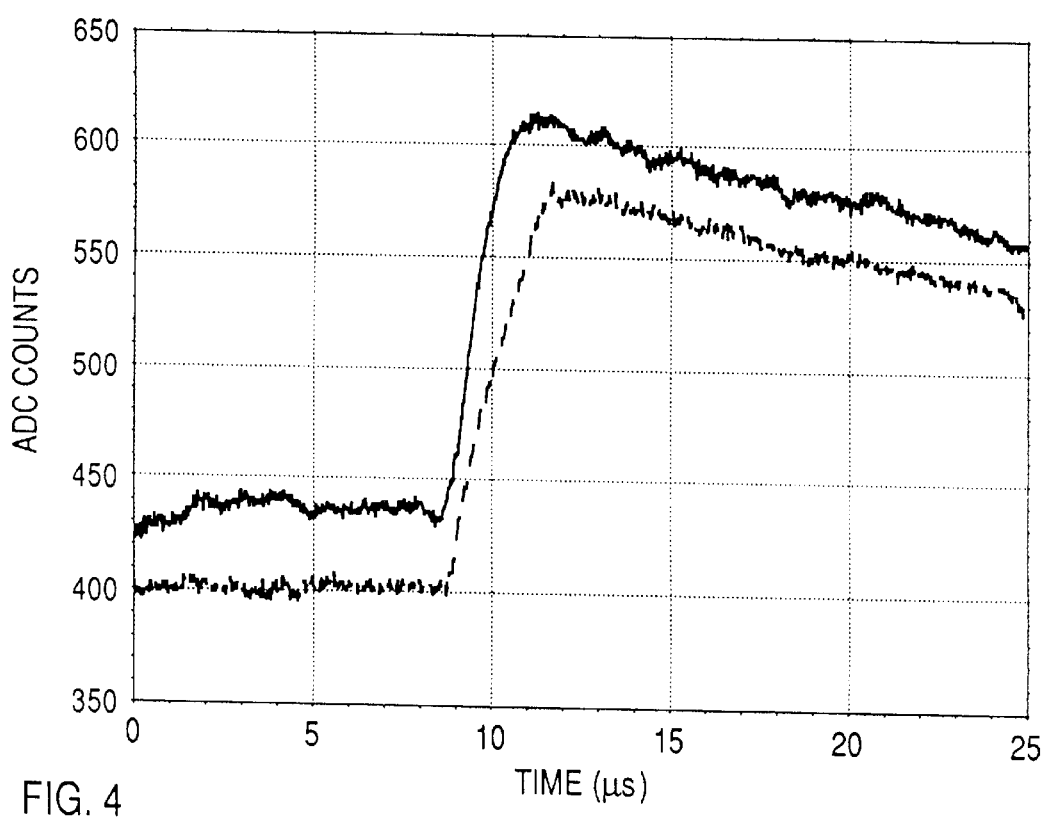
FIG. 4 repeats FIG. 3 for two ionization tracks emitted from the backwall of the detector shown in FIG. 2.

FIG. 4 shows two backwall traces obtained by placing the alpha source on the detector backwall surface. The two risetimes are different, but both (2.5 and 3.3 $\mu$s, respectively) are over two times faster than the sample wall collection times. Initial slopes are about 100 charge units/$\mu$s, four times larger than in the sample wall case. Traces from alpha tracks 27 emanating from the anode wires 40 will look much like backwall traces, since their tracks originate within the high field regions near the wires. Half of these traces will penetrate into the backwall space, further contributing to their rapid charge collection characteristics. The other half, which penetrate into the sample space will be collected more or less quickly, depending upon their angle to the anode plane. Only those nearly perpendicular to it will have long total charge collection times, but even these will be shorter than true sample trace collections since dimension R significantly exceeds the maximum track length by design. Both their large initial slopes and shorter overall collection times will therefore distinguish anode wire source events from true sample source events.

It is worth noting that our ability to discriminate between backwall and sample wall emanation points for the alpha induced ionization tracks depends primarily on the fact that our placement of the anode breaks the symmetry of the counting chamber. In this case we have two planes (backwall and sample planes) whose separation is given by the parameter S. By making the distance B to the backwall smaller than the distance R to the sample, which is also made longer than the maximum expected range, we cause the output pulses from the two planes to acquire their distinguishable features. If we were to move the anode to the symmetric location, where B equaled R, then the pulses from the two sides would become identical and indistinguishable. Further, if we made B much larger than R (i.e. exchanged the roles of B and D from our preferred design) then the pulses would become distinguishable again as all of the descriptive arguments presented above reversed so that sample wall tracks would produce fast risetime pulses and backwall wall tracks would have constant collection times, etc. This shows that it is the broken symmetry that leads to the ability to distinguish emanation points and not the precise arrangement we have described. In other, non-planar geometries, the same principle will apply and serve to guide the placement of the anode.

2.4. Source Point Discrimination
Digital Circuit for Determining

Figure 5:
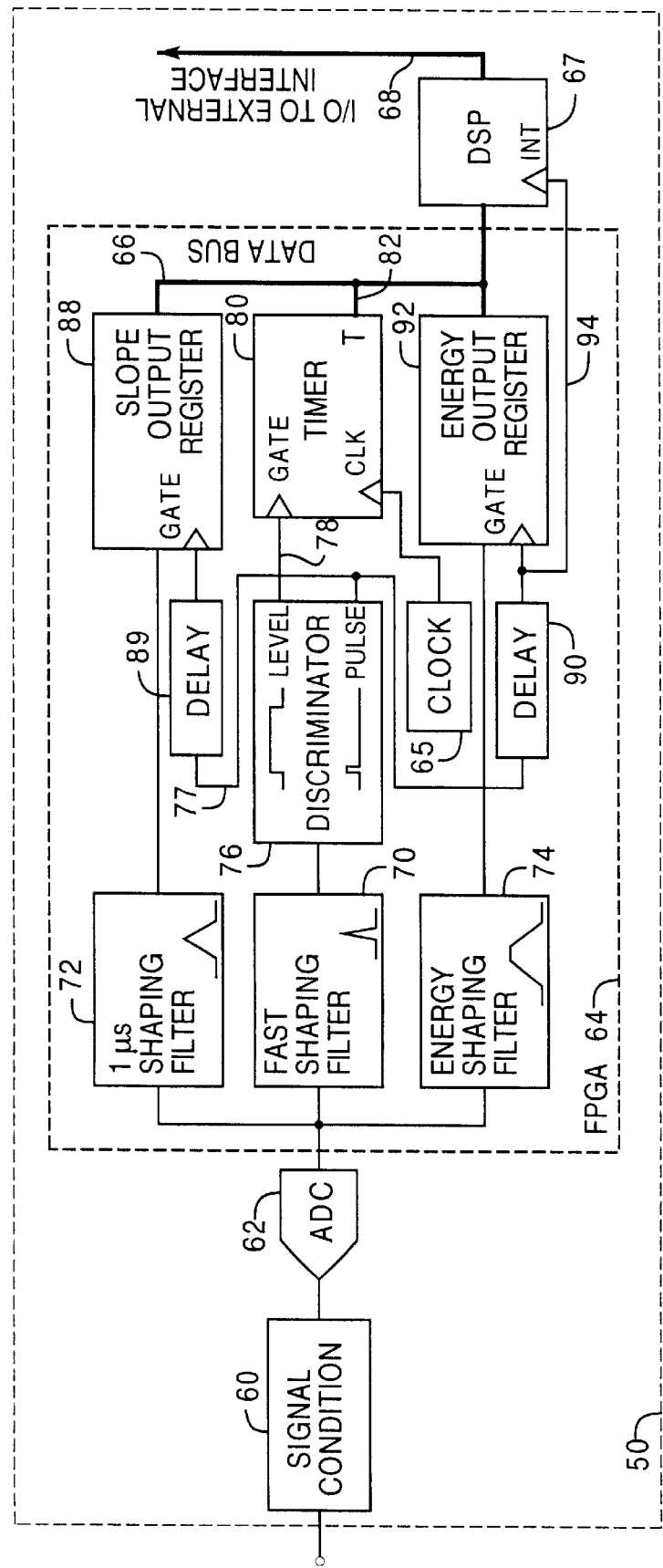
FIG. 5 shows a block diagram of the digital signal processor 50.

FIG. 5 shows a block diagram of a digital processing circuit 50 that may be used to perform the pulse feature analysis operations required to determine the source of emission of alpha particles in a detector such as the one shown in FIG. 2. The circuit topology is similar to that described in the U.S. Pat. No. 5,873,054 of Warburton and Zhou [WARBURTON-1999], wherein fast combinatorial logic is used to process a digitized signal output by an analog-to-digital converter (ADC) on a sample by sample basis at the clock speed of the ADC and a digital signal processor (DSP) or other digital computing device that receives data values from the combinatorial logic on an event by event basis at the pulse arrival rate and carries out additional operations to complete the required analysis.

The circuit comprises a section of analog signal conditioning circuitry 60 feeding an ADC 62 whose output is connected to a fast combinatorial logic circuit 64 which also accepts input from a clock 65 and has an output data bus 66 attached to a DSP 67. I/O lines 68 connect the DSP to an external interface to display the processed data or send them to an external computer for further processing, display, and/or storage as may be required. The analog signal conditioning circuitry 60 and ADC 62 together comprise a generalized analog-to-digital converter. The functions of the signal conditioning circuitry 60, which may or may not be required in specific implementations, are to match the output range of the preamplifier to the input of the ADC 62 and to filter the preamplifier output to satisfy the Nyquist criterion for the ADC sampling rate. The ADC is selected by comparison to the expected signals, requiring enough bits to effectively resolve them and being fast enough to give good time resolution. In practice we have found that a 12-bit, 20-MHz device works well. The combinatorial logic circuit 64 is typically implemented in a field programmable gate array (FPGA), which is adequately fast and has the advantage that its logic design is readily modified to incorporate improvements in data processing algorithms.

Within the FPGA logic circuit 64 the ADC signal is split into three paths, going to a fast triangular shaping circuit 70, an intermediate peaking time triangular shaping circuit 72 and a long peaking time trapezoidal "energy" filter circuit 74. The fast shaper 70 is used to detect the presence of pulse signals in the preamplifier output. Its peaking time is chosen to be long enough to reduce noise sensitivity and short enough compared to the 0-to-100% rise times of the expected pulses to give good time resolution. For the signals shown in FIGS. 3 and 4, a 400 ns peaking time was found to work well. The intermediate triangular shaper, which acts as an averaging differentiator, is used to measure the signals' initial slopes. Looking at FIGS. 3 and 4, a slope measurement made after about 1 $\mu$s would give good differentiation between the two kinds of signals, so we set this shaper's peaking time to 1 $\mu$s, and will capture its output value about 1 $\mu$s after the pulse is detected. The peaking time and gap for the slow "energy" filter 74 are determined as follows. First, the gap has to be as long as the slowest risetime signal that will be measured. In the present case that is 8 $\mu$s. The peaking time is then set to give acceptable energy resolution, which, since energy resolution in gas detectors is limited by charge induction fluctuation and not electronic noise, is not a tight constraint. In the work shown, 4 $\mu$s was used, but values from 1 to 8 $\mu$s also work acceptably.

We have placed the "energy" part of "energy" filter in quotation marks because, although this is the role usually played by this filter in gas detectors, it actually only measures the amplitudes of the pulses, which also strongly depend upon charge collection time in the counter geometries we are working with. However, for the sake of convention, we will continue to refer to this as an energy measurement and, by extension, similarly refer to the "energy" of a pulse with the understanding that we have really only measured its amplitude.

The fast shaper 70 feeds into a discriminator 76 which has two outputs: a pulse output 77 which goes high for one clock cycle when the output of the fast shaper is first detected to exceed threshold, and a level output 78 which goes high concurrently with the pulse output 77 but stays high as long as the fast shaper output exceeds threshold. The level output 78 is used to gate a timer 80 which counts pulses from the clock 65 to measure the time the fast shaper's output exceeds threshold. This value T 82 then represents our measurement of the total charge collection time. Pulse output 77 is delayed for 1 $\mu$s by delay 89 and then gates slope output register 88 to capture the output of the intermediate triangular shaper 72 as a measurement of the initial slope of the signal pulse. Pulse output 77 is also delayed a predetermined time by delay 90 and used to trigger energy output register 92 to capture the output of the trapezoidal energy filter 74 as a measure of the signal pulse's amplitude. This delayed pulse 94 can also be used to interrupt the DSP 67, signaling it that a pulse has been detected and that captured time, slope, and energy values can be read from the timer 80 and output registers 88 and 92 over the data bus 66.

The DSP 67 completes the measurement by using the measured charge collection time and initial slope (or initial slope divided by energy) to identify the pulse as having originated at the sample or backwall and then, if desired, collecting the energy spectra of either or both types of pulses.

While our preferred embodiments employ a digital processing circuit 50 to discriminate between different points of alpha track origin, it is clear that these functions could be implemented using classical analog processing functions as well. All of the filters 70, 72, and 74 could be replaced by analog shaping filters, discriminators are common analog components (to replace digital discriminator 76), as are track and hold circuits to replace the output registers 88 and 92. A time to amplitude converter would replace timer 80, and analog pulse delays could be used to replace both the delays 89 and 90. The ratio of slope over energy could be produced with an analog multiplier circuit and the comparisons to threshold values also done with analog comparators. All of these analog functions are readily had from nuclear spectroscopy equipment dealers. However, as they may be carried out more cheaply, compactly, and with less power consumption digitally, we have chosen that path as generally preferable.

Other digital implementations are possible as well and, in some cases can provide superior results. For example, the trapezoidal energy filter output is the difference of two running average filters separated by a fixed gap interval. Since our preamplifier has an RC decay constant and the filter gap is set to accommodate the longest pulse rise time, it will not accurately measure the amplitudes of pulses with much shorter risetimes. A superior approach would be to adjust the gap on a pulse-by-pulse basis. Thus the output of the running average filter would captured immediately after the pulse maximum is detected (i.e. the level output 78 of discriminator 76 returns to its low value) and from this would be subtracted the output of the same filter (slightly time delayed) captured when output 78 first goes high, which would thus represent the value of the preamplifier signal slightly before the arrival of the pulse.

Processed Source Test Data

Figure 6A:
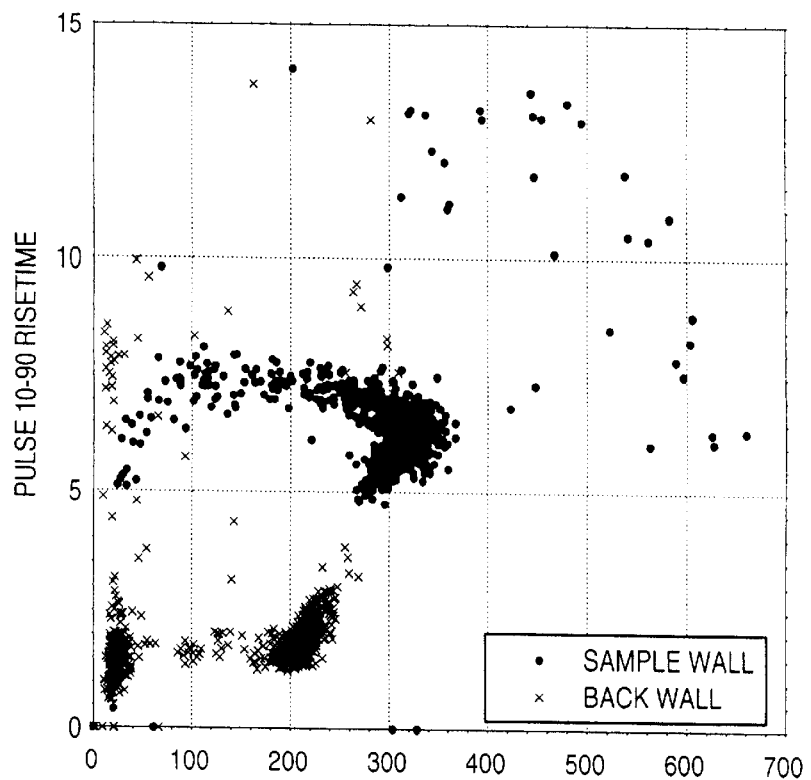
FIG. 6A shows a scatter plot of 10-to-90% pulse risetime versus pulse amplitude for a series of signals measured from a source placed at two locations (on the sample wall and on the backwall) within the detector shown in FIG. 2.
Figure 6B:
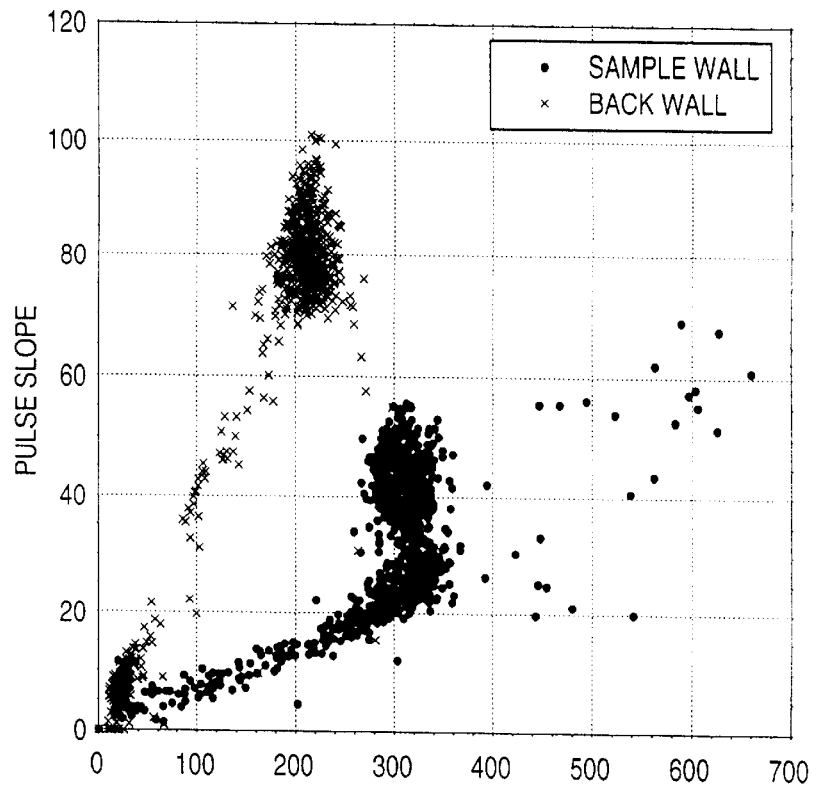
FIG. 6B shows a scatter plot of initial pulse slope versus pulse amplitude for the same set of signals as in FIG. 6A.

The method of the preceding paragraphs was tested as follows. First an Am-241 alpha source was placed at several locations on the sample wall of the detector and traces were captured using an XIA DGF-4C digital signal processor with trace capture capability. The traces were then analyzed off-line using the same algorithms represented in the discussion of FIG. 5. The process was then repeated, placing the source at several backwall locations. The results are shown in FIGS. 6A and 6B for a 1000 pulses each from a typical source wall location and a typical back wall location. FIG. 6A plots 10-to-90% pulse risetime versus final pulse amplitude. This measure of risetime was used here, rather than the timing method described above because it was easier to implement in computer processing. If desired, it could readily be implemented in the fast logic 64 by building a pair of constant fraction discriminators and measuring the time between their outputs. As may be seen in FIG. 6A, pulses from the two source locations separate fairly cleanly into two distinct regions for pulses with amplitudes above about 50. The logical test "(IF(pulse amplitude greater than 50) AND (IF(pulse risetime greater than 4.5))" can be seen to discriminate against back wall events with 98–99% accuracy, allowing the counter background from these events to be reduced by two orders of magnitude.

Figure 6C:
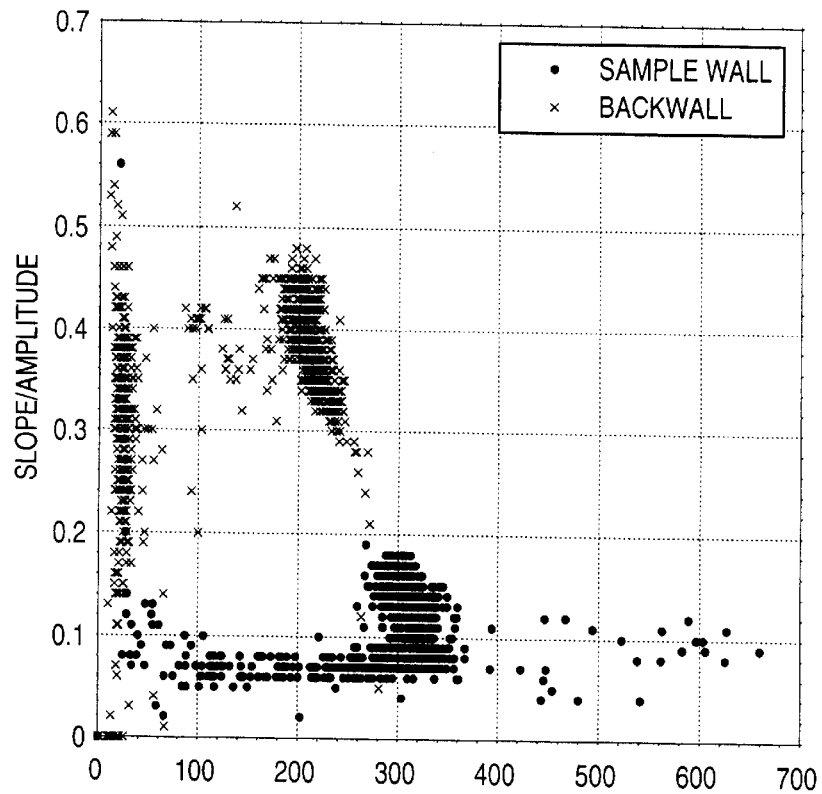
FIG. 6C shows a scatter plot of initial pulse slope, but scales the initial pulse slope by the pulse amplitude for each signal.

FIG. 6B shows initial pulse slope, measured over the first microsecond of the pulse, plotted against pulse amplitude for the same set of signals as in FIG. 6A. The separation into two regions appears to be even cleaner than in FIG. 6A, but a more difficult logical test is required to separate them, since pulse slope is clearly proportional to pulse amplitude. Therefore, in FIG. 6C we plot initial pulse slope divided by final pulse amplitude versus final pulse amplitude. This plot very cleanly differentiates between the two different sources of ionization tracks. The logical test "(IF(pulse amplitude greater than 80) AND (IF(slope/amplitude less than 0.19))" can be seen to discriminate against back wall events with 99.8% accuracy (2 back wall events in 1000 sample events), allowing the counter background from these events to be reduced by three orders of magnitude while maintaining about 98% efficiency for sample wall events (23 events with magnitude below 80).

Figure 6D:
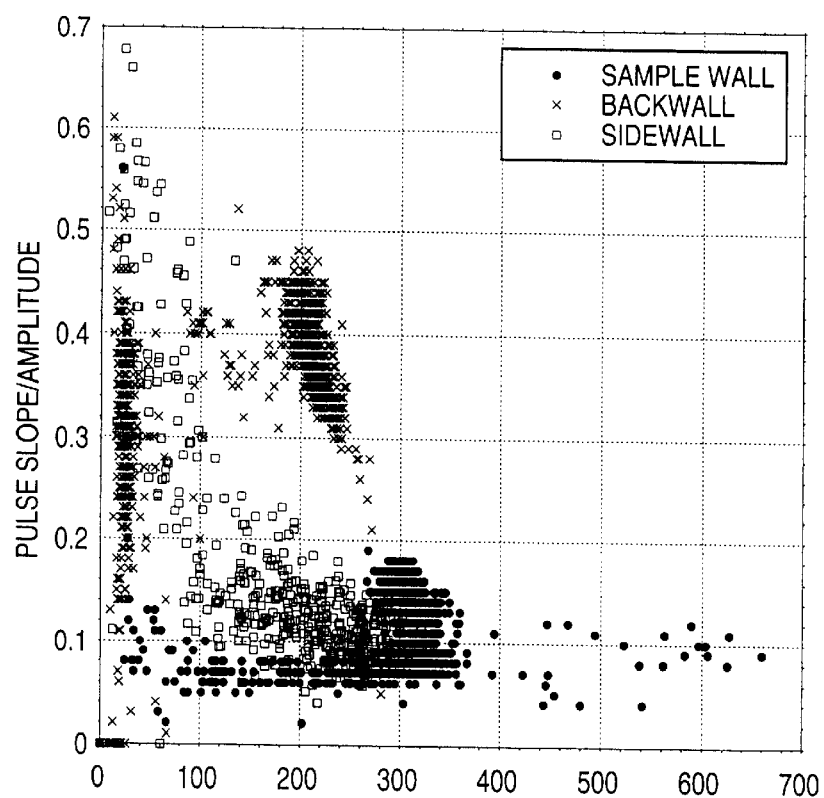
FIG. 6D shows a scatter plot of initial pulse slope, but adds signals from a source on the detector side wall.

These tests, however, are not nearly so effective in discriminating against ionization tracks emanating from side wall location. FIG. 6D shows 1000 events from a source located on the detector side wall overlaid on the plot of FIG. 6C. These events, depending upon their ionization track trajectories, can clearly be mistaken for either source wall or sample wall events. Because this source was placed in the middle of the side wall, the signal amplitudes generally have smaller amplitudes than true sample source tracks, but, since the side wall extends from the sample wall to the back wall, this will not be generally be true. In the following section we consider how to discriminate against these pulses.

2.5. Guard Wire Addition

Sidewall Source Signals

In a detector designed per the specifications of FIG. 2, the area of the sidewalls will be comparable to the area of the backwall. Dimension B plus R will typically be about 10 cm. For a 1000 $cm^2$ detector (35 cm×35 cm) the backwall area will then be 1225 $cm^2$, compared to the sidewalls' area of 1400 cm. FIG. 2 shows the track 26 of an alpha particle emanating from the sidewall, headed toward the sample. As this track 26 drifts toward the anode, it will initially produce the small initial slope characteristic of sample tracks, since it is drifting in the same low-valued field. Because its drift distance is less than R, however, its charge collection time will be less than those characteristic of sample source tracks. A significant fraction of sidewall source tracks like track 26, however, will be pointed in such directions and have such track lengths that they start at some sidewall location and terminate on the sample. As they drift to the anode, however, these tracks will now be indistinguishable from sample source tracks that originate at the sample and terminate on the sidewalls and as seen in FIG. 6D, will therefore contribute as undesirable background counts which we would prefer to be able to reject.

Design of Chamber with Guard Wire

FIG. 7 repeats FIG. 2, but modified by the addition of a guard wire 100 that surrounds the perimeter of the anode. This guard wire may either be in the same plane as the anode 40 or separated slightly from it, as shown. The guard wire 100 is biased similarly to the anode 40 via a resistor 107 from voltage source 8 and connected to a preamplifier 111 via a capacitor 110. Preamplifier signals are then fed into a second digital processor 150. The digital processor 150 is a stripped down version of digital processor 50, lacking (by reference to FIG. 5) the clock 65, shaping filter 72, slope output register 88, DSP 67, and the control lines 68 and 94. Instead, the guard wire processor 150 takes its clock signal from anode processor 50, so they run synchronously, and its data bus is an extension of the anode processor's data bus 66 so that the anode processor's DSP 67 can record values captured by the timer and energy output register in the guard wire processor 150.

Sidewall Emission Point Signals

Figure 8:
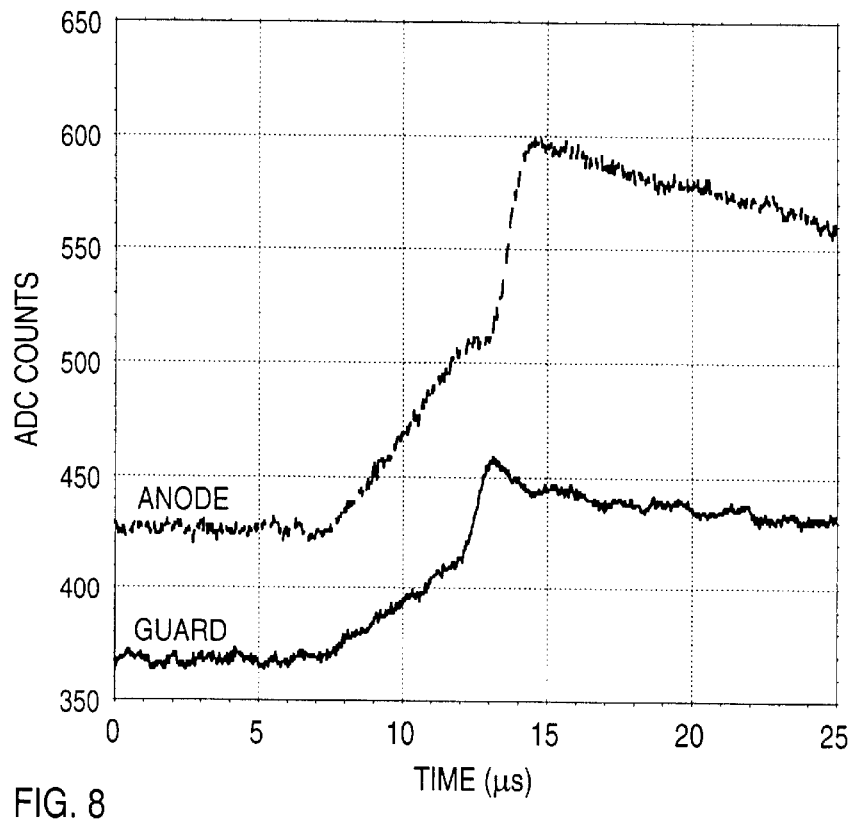
FIG. 8 shows preamplifier output traces of charge signals induced on the guard and anode electrodes during the collection of an ionization track emitted from the sidewall of the detector shown in FIG. 7.

To view sidewall emission point signals, we modified our FIG. 2 detector by the addition of a guard wire, per FIG. 7, placed an Am-241 alpha source on a sidewall, and captured both anode and guard wire signals using our XIA DGF-4C module. FIG. 8 shows such a pair of traces. The anode trace rises in about 5 $\mu s$, which might or might not pass the risetime test as a source emission pulse. The guard wire signal, however, is clearly present and can easily be used to identify this as a sidewall emission pulse and reject it. The breaks in the two curves occur as significant amounts of charge are collected first on the guard wire and then on the anode and cease inducing charge on each other. In using the guard wire signal in anti-coincidence mode in this manner, the feature of the guard wire signal that we are analyzing is its time of arrival, relative to the time of arrival of the signal from the anode.

Sample Emission Point Signals

Figure 9:
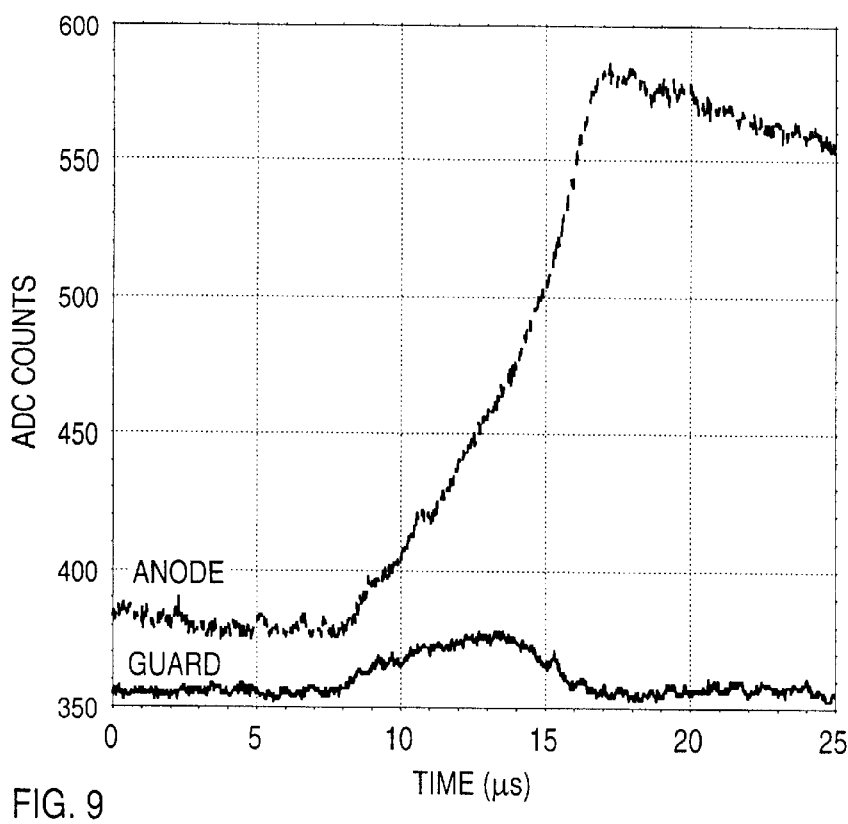
FIG. 9 repeats FIG. 8 for an ionization track emitted from the sample wall of the detector shown in FIG. 7, where the track approaches the sidewall but does not deposit any charge on the guard electrode.

With the guard wire in place, we also measured signals with the source placed close to the edge of the sample area in the FIG. 7 detector. From this source location, it is clear that some tracks will head back toward the center of the anode, some will go straight down and some will pass over the guard wire. The latter will induce charge on the guard wire and be rejected and this loss of source counting efficiency is a penalty we must pay for eliminating sidewall counts, since the two tracks are physically indistinguishable. The other two cases, however, require a more sophisticated treatment if they are to be counted and not rejected. FIG. 9 shows a trace from this location where no net charge is collected on the guard wire. The anode trace clearly passes both collection time and initial slope tests. A simple discriminator test applied to the guard wire signal, however, would cause it to be rejected. There is, however, no net charge collected on the guard wire, since the signal pulse's final amplitude change is zero. Therefore, if we capture both charge collection and energy filter values from the guard wire signal processor 150, we can specify the sidewall veto test logic to be "((IF(guard wire collection time overlaps anode collection) AND (IF(guard wire collected charge greater than zero))." This test will maximize sample source counting efficiency, a benefit when counting extremely low activity samples. At 0.005 counts/cm 2/hour, for example, a 1000 cm² sample only produces 5 valid counts per hour and each must be treated as valuable. Applying this test allows us to reject the side wall events in FIG. 6D and return to the discrimination ratios shown in FIG. 6C. In this case, then, we are analyzing two features of the guard wire signal: its arrival time relative to that of the anode signal and its total collected charge as measured by the final change in its amplitude.

2.6. Design Summary

Our preferred embodiment as a multi-wire gas counter therefore uses the physical design presented in FIG. 5, with both a set of anode wires and a surrounding set of one or more guard wires, each set attached to its own preamplifier and signal processor, as shown. The test for a good signal from the sample surface is that its charge collection time must exceed a first threshold AND its initial slope must lie below a second threshold AND there is no guard wire veto signal, where a valid veto signal comprises having the veto wire collection time exceed a third threshold AND the veto energy exceed a fourth threshold. The four threshold values will be set to optimize performance based on the amplitudes of these signals for expected alpha particle energies and the observed noise properties of the preamplifier circuits.

2.7. Proportional Counter Operating Mode

Multi-wire counters are often operated with gain in the proportional region, since this produces larger signals which are easier to work with. However, in this configuration, output signals are only produced as charge actually arrives at the anode (or guard) wires. If the detector is designed to retain the drift field asymmetry shown in FIG. 5, however, ionization tracks originating from the sample and backwall regions can still be distinguished since initial charge arrival times will generally be slower in the former case than in the latter. Geometric orientation of the tracks will now influence arrival times, however (a sample track nearly parallel to the sample, for example, will arrive at the anode in a very short time period and might be mistaken for a backwall origin track). Therefore, while background reduction can be accomplished while operating the counter in proportional mode, it is not our preferred mode, compared to the ionization mode, wherein we obtain not one but two selection criteria and these criteria are not confused by track orientation issues.

3. Parallel-Plate Ionization Chamber Embodiment

The previous section described a preferred embodiment of our background reduction invention as a multi-wire gas detector, and this embodiment works very well. In general, however, multi-wire counters have certain practical disadvantages including delicacy of the wires and microphonic noise from wire vibrations. The former problem is eliminated by our use of larger diameter wires to produce operation in the ionization regime. The latter problem remains however, and requires special construction and operation techniques to suppress. The construction techniques are of special concern, since the more different materials that are required in detector fabrication, the harder it becomes to assure that none of them introduce alpha source contaminants.

3.1. Detector Description

Our second preferred embodiment is therefore as a parallel-plate ionization chamber. This design offers three practical advantages. First, with proper plate design, microphonics disappear. Second, by embedding the plates in their supporting medium, it becomes possible to design a detector which may merely be cleaned if it becomes contaminated, rather than having to be rebuilt. Third, for large area detectors, parallel-plates have lower capacitance than a wire array of the same area and, since preamplifier noise increases with input capacitance, the design produces increased signal-to-noise ratios, which simplifies preamplifier design and increases detector sensitivity.

FIG. 10 shows a first embodiment of our invention as a parallel-plate ionization chamber. The design is quite similar to the FIG. 7 multi-wire gas ionization chamber design, except that the guard wires 100 and anode wires 40 have been replaced by a guard strip 200 and an anode collection plate 205. The rest of the design is identical and identical part identification numbers have been used to emphasize this.

3.2. Signal Descriptions

The signals produced in this detector will be generally similar to those produced in the FIG. 5 detector and similar techniques may be used to distinguish between ionization tracks emanating from different parts of the chamber. In particular, as before, guard strip signals can be used to reject tracks emanating from the chamber sidewalls. However, as opposed to the former case, the electric field in this design will, with good design, be nearly uniform everywhere within the detector volume, which allows the charge collection signals to be expressed analytically and examined to determine what rejection margins may be obtained.

Analytic Solutions

Figure 11A:
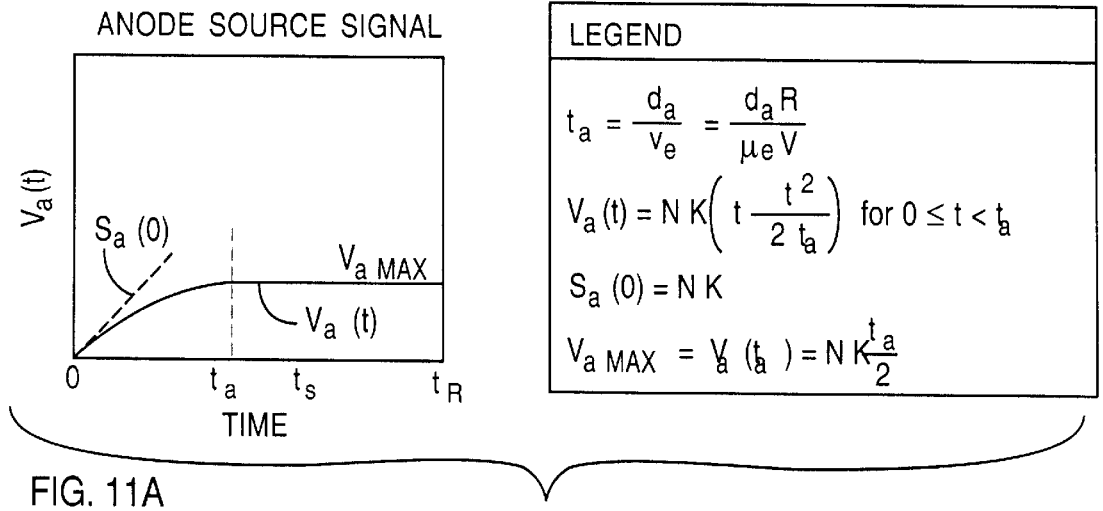
FIGS. 11A and 11B define distances for alpha tracks emitted from the anode and sample planes and show analytic solutions for the induced charge signals produced as they are collected.
Figure 11B:
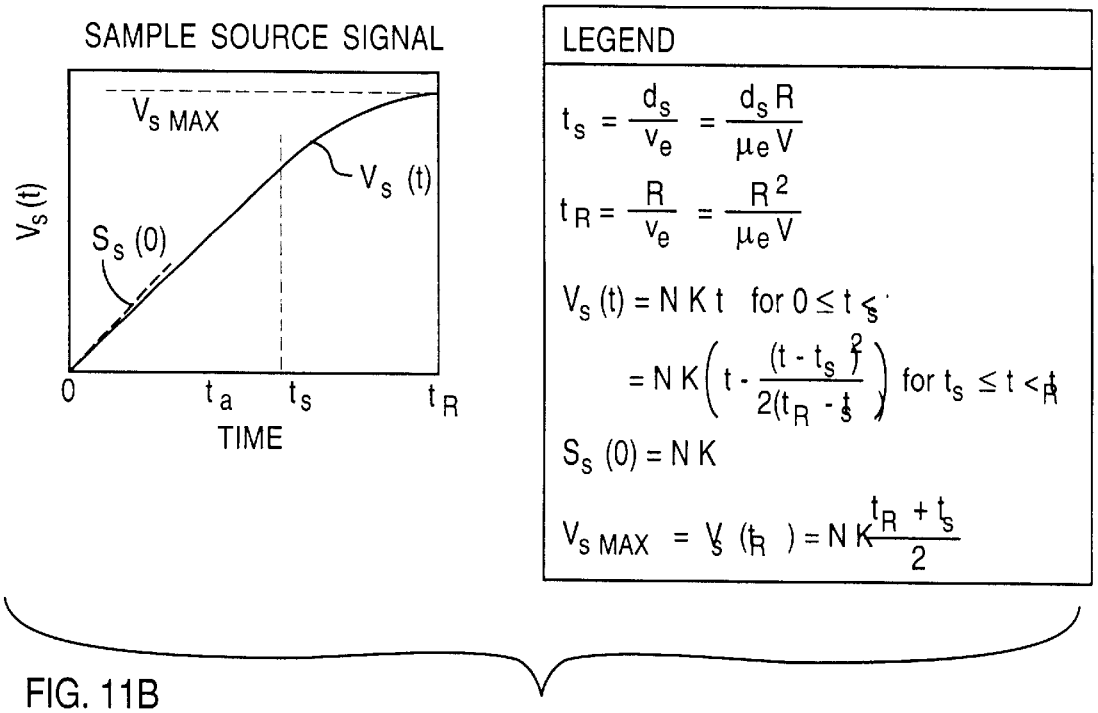

FIG. 10 shows a first alpha particle track of length $\rho_s$ emanating from the sample at angle $\beta$ and a second alpha particle track of length $\rho_a$ emanating from the anode at angle $\alpha$, their points of maximum extent lying distances $d_s$ and $d_a$ from the anode plane, respectively, the anode and sample being separated by distance R. FIGS. 11A and 11B show analytic solutions for the preamplifier outputs $V_a(t)$ and $V_s(t)$ resulting from these two charge tracks. FIG. 11A shows $V_a(t)$ as the anode alpha track is collected, together with the equations describing its properties. FIG. 11B similarly shows $V_s(t)$ for the anode alpha track. In these equations, N is the number of electrons deposited along the full track length and the constant K is given by $K = e\, v_e/RC_f$, where the electron velocity $v_e = \mu_e E = \mu_e V/R$, $\mu_e$ being the electron mobility in the detector gas, E the electric field, and V the applied voltage. The electron charge is e, and $C_f$ is the value of the preamplifier feedback capacitor.

Charge Collection Time Discrimination

As in the multi-wire detector case, all sample signals have the same duration, $t_R = R/v_e$. The longest signal from an anode emanating alpha track will be give by $t_{aMAX} = \rho_{MAX}/v_e = R\rho_{MAX}/\mu_e V$, where $\rho_{MAX}$ is the maximum expected alpha track length from the anode. The difference between this time and $t_R$ is then $$\Delta t = (R - \rho_{MAX})R/\mu_E V \quad (1)$$

Clearly both R and V may be adjusted to achieve both a comfortable maximum transit time and an easily distinguished difference between the two cases. For example, making R=3 $\rho_{MAX}$, produces a three-to-one ratio between the maximum anode charge collection time and the full sample charge collection time. For a typical $\rho_{MAX}$ of 3.5 cm, V is easily adjusted so that $t_{aMAX}$ equals 3.5 μs and $t_R$ equals 10.5 μs, which are easy times to separate and easy to work with as well.

Scaled Initial Slope Discrimination

Looking at the equations in FIGS. 11A and 11B, we see that, if two tracks have equal numbers of electrons N, then their output traces both have the same initial slope: $S_s(0)$ equals $S_a(0)$ because, initially, both tracks have the same number of drifting electrons. Thus the value of slope alone cannot distinguish between the two track origins. However, because the sample origin tracks drift much further, they induce a greater total charge on the anode and are thus measured as having a much larger maximum output voltage $V_{MAX}$, or "energy" as measured by our energy filter. If we therefore scale initial slope by measured energy, we find:

$$S_s(0)/V_{sMAX} = 2/(t_R + t_s) \quad (2a)$$

$$S_a(0)/V_{aMAX} = 2/t_a \quad (2b)$$

$$\text{And } [S_a(0)/V_{aMAX}]/[S_s(0)/V_{sMAX}] = (R + d_s)/d_a = M \quad (2c)$$

For tracks of length ρ, the least margin M between the two scaled slope measures occurs when the anode scaled slope is minimum ($d_a$=ρ) and the sample scaled slope is maximum (R+$d_s$)=2R−ρ. Using the design criterion from the previous section, R=3 $\rho_{MAX}$, gives $M_{MIN}$=5, so the two sets of values are always well separated. We therefore see that, just as in the multi-wire detector case, we have two different tests that we can use to distinguish between tracks originating from the sample and those originating from the anode electrode plane.

It is important to note that, while we have focused on the initial slope in the above discussion and derivation, the pulse's slope at times later than the initial slope continues to carry much of the same information and can also be used similarly to discriminate between different points of origin. In the particular implementations we have described, the initial slope (in the wire chamber case) or scaled initial slope (in the parallel-plate case) are the most sensitive discriminators between points of origin. In other implementations with different internal electric fields, slopes or scaled slopes at later points in the pulse may be more appropriate to analyze.

3.3. Additions to Improve Performance

The parallel-plate ionization chamber shown in FIG. 10 becomes our preferred parallel-plate embodiment with the addition of the following three improvements.

Field Uniformity Enhancement

The detector shown in FIG. 10 will not have truly uniform electric fields in its interior because the plates are too far apart, compared to their lateral dimension (e.g., 10.5 cm compared to 35 cm). Close to the edges the fields bow outwards, carrying charges that originate completely within the sample area over the guard strips and even into the walls of the counter. These longer field lines can also result in slower charge collection times for anode source alpha tracks, which would reduce rejection margins. One approach is to increase the width W of the guard electrodes so that it approaches the chamber height R. While effective, this greatly increases the chamber's active volume, since the guard strips are on the perimeter of the detector. For example, a chamber with 1000 cm² active area (31 cm by 31 cm) and a height of 10 cm, would have a total area of 2665 cm² (51 cm by 51 cm) if W were 10 cm.

Figure 12:
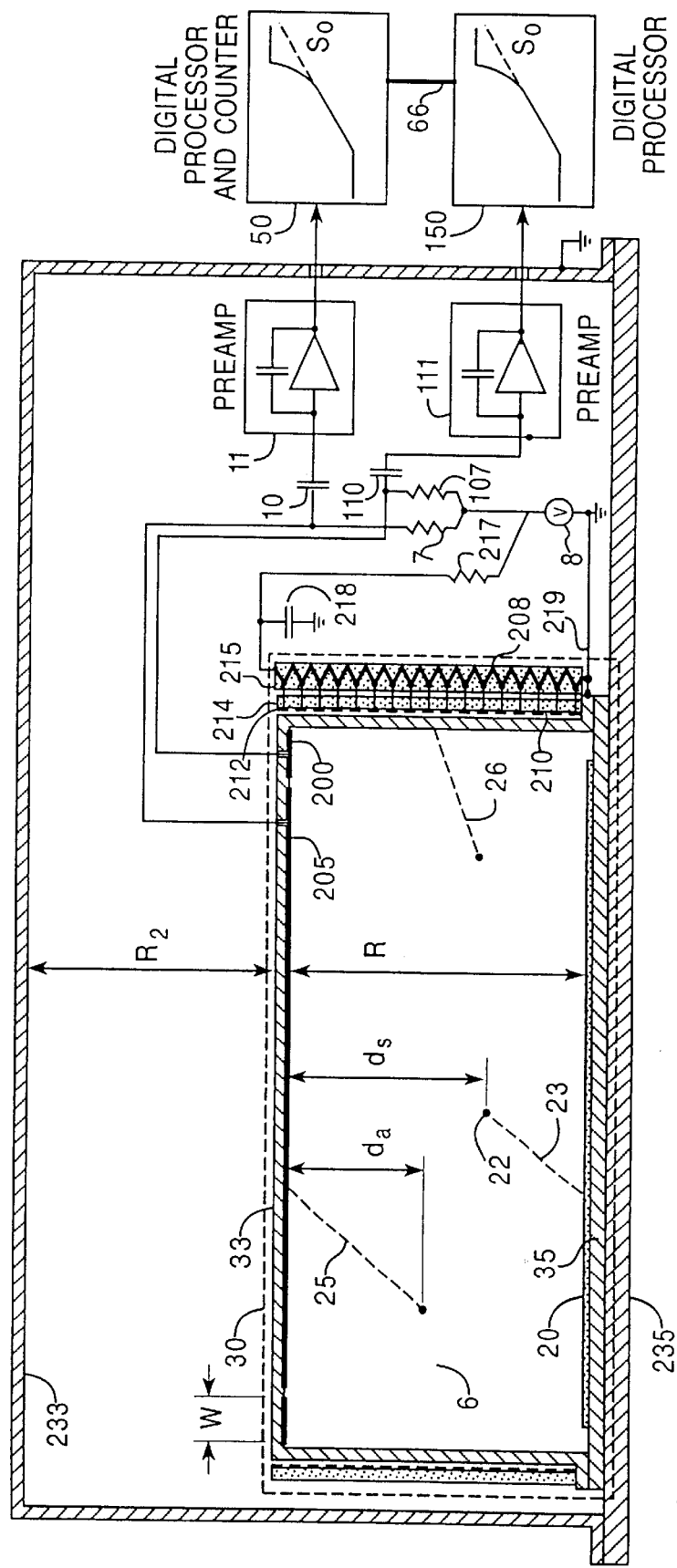
FIG. 12 shows a preferred embodiment of the invention as a gas-filled, parallel-plate ionization chamber with guard electrodes, field shaping electrodes, and anode capacitance reducing electrode.

In our preferred embodiment, as shown in FIG. 12, we have therefore added a field shaping electrode 210 to surround the parallel-plate chamber 30. This electrode can be easily manufactured, for example, as a series of stripes 212 on a printed circuit board 214, each attached to a node on a resistor divider chain, 215 which is connected to the voltage source 8 at its anode end via an isolating resistor 217 and capacitor 218, and to ground via a lead 219 at its sample end. Using equal valued resistors in the divider chain 215 causes the voltage at the surface of the shaping electrode 210 to smoothly pass from V at its anode end to ground at its sample end, which, in turn, forces the field lines a short distance into the chamber volume to lie parallel to the shaping electrode's surface and thus perpendicular to the anode and sample surfaces. The chamber manifold 33 must of course be made of a non-conducting material for this method to be effective, but this is also required if the chamber itself is not to distort the electric field lines between the anode and sample planes.

Performance of a Preferred Embodiment

Figure 13:
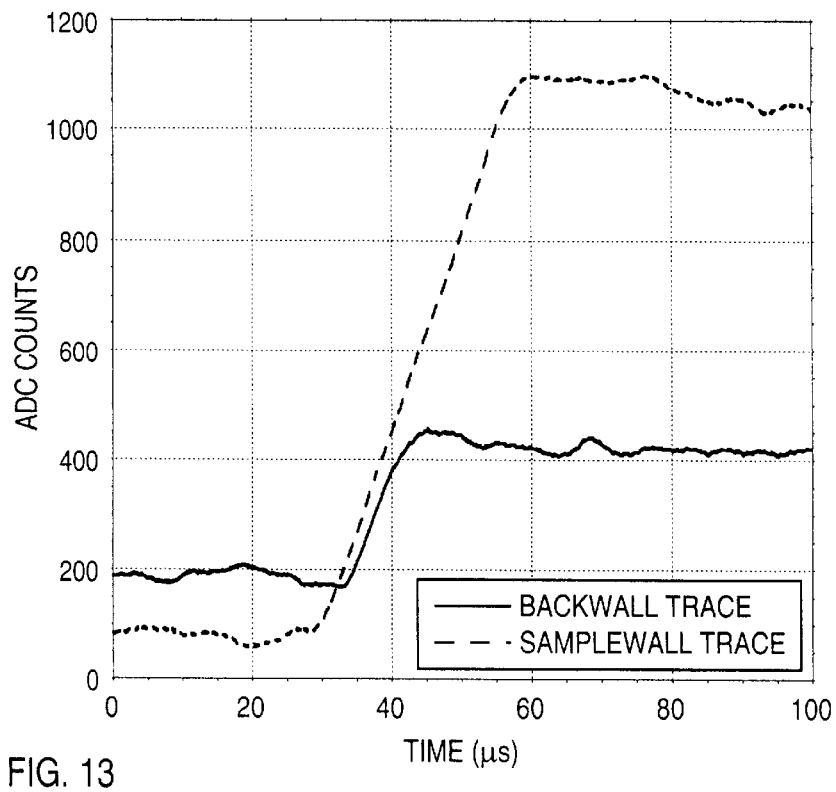
FIG. 13 shows typical preamplifier output traces of charge signals induced on the anode during the collection of one ionization track emitted from the sample wall of the detector shown in FIG. 12 and one ionization track emitted from the detector's backwall.
Figure 14:
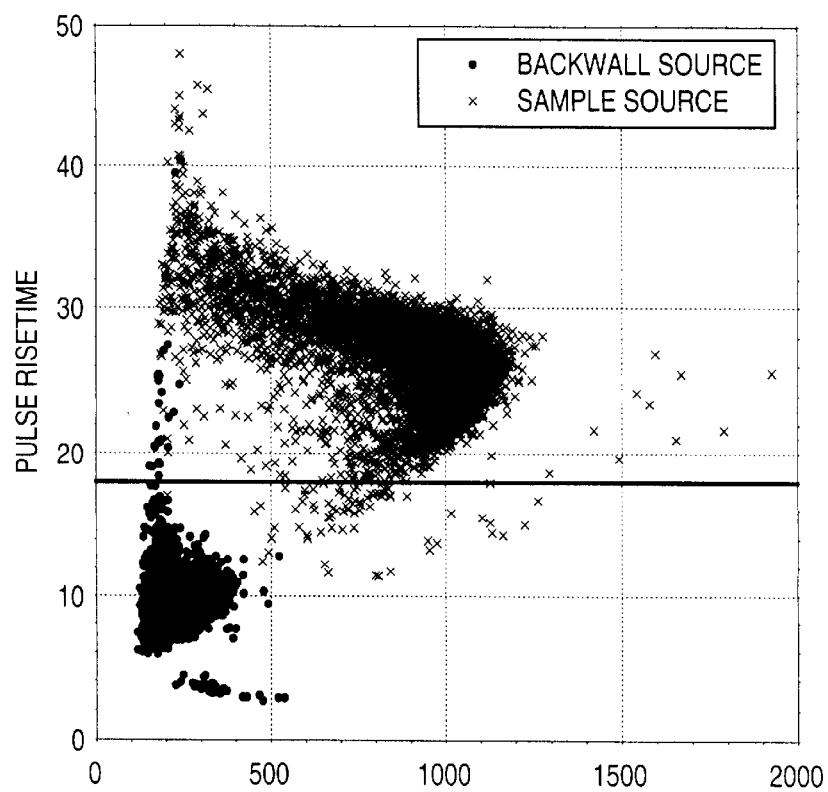
FIG. 14 repeats FIG. 13 for 10,000 ionization tracks emitted from the detector's sample wall and 10,000 ionization tracks emitted from the detector's anode backwall.

FIG. 13 shows typical preamplifier output traces generated by ionization tracks emitted from the detector's sample wall 20 and its anode backwall 205. For nominally equal alpha particle energies the two traces are very different. The sample wall trace is both three times larger in amplitude than the backwall trace and also possesses nearly three times the risetime, 28 μs compared to 10 μs. These differences make the two emission sources fairly easy to separate. In FIG. 14 we show a scatter plot of 10,000 traces collected with an Am-241 source placed on the sample wall and an additional 10,000 traces collected with the same source placed on the anode backwall. Using only a risetime cut at 18, as shown, we find only 24 backwall traces on the sample side of the line and about 75 sample traces on the backwall side of the line. The 24 counts show that our acceptance ratio for background counts emanating from the anode backwall is 24 divided by 10,000 (0.24%) for a rejection ratio of 99.76%. The 75 traces represent lost counts from the sample side, yielding a 99.25% counting efficiency. There are more complex data cuts which use both risetime and amplitude information which can do far better (e.g., the line between risetime equals 30 and pulse amplitude equals 1500 yields a background acceptance ratio of only 0.05%), but even the simple cut serves to illustrate the basic principle of the invention.

Anode Shielding and Capacitance Reduction

When measuring large area, low activity samples, the anode area will have to be approximately the same area as the sample (e.g., 1000 cm²) and thus will be an excellent antenna for picking up environmental interferences. To minimize this, the entire counter can be shielded within a grounded enclosure, where the ground shield includes a cover 233 and a base plate 235. This enclosure must not pass to close to the anode 205, since this would cause the anode capacitance to increase significantly and, as a result, the input noise in the anode preamplifier circuit 11. Therefore, the enclosure cover 233 must be designed to maintain a separation $R_2$ from the anode which is approximately as large as the distance R between the anode 205 and the sample 20.

Environmental Background Suppression

Finally, a good way to minimize background counts is to start with as few as possible. Therefore the inside of the parallel-plate chamber should be constructed of low alpha emitting materials. This is particularly simplified in the present design since there need be only two materials within the chamber walls: the chamber wall material itself and the anode/guard strip conductor material. For the chamber material we have found that plastics work well, being naturally low-Z materials and thus not prone to contamination by alpha emitters. For the anode electrodes, various choices are possible. Knoll reports that certain stainless steels are very low alpha emitters. [KNOLL-1989, pp. 724–725] Ultra-low alpha emitting Ni can be manufactured by a chemical-vapor-deposition process and either used directly or to clad other materials if desired. [BROWNE-1999] Finally, either the anode 205 and guard electrode 200 or the sample mounting surface 35, or both, can be made out of semiconductor grade Si, which is hyper pure and still has adequate conductivity for the purpose.

3.4. A Construction Note

A final problem is that measurement chambers tend to become contaminated by the materials they measure. With prior art systems, this is tolerated up to a point and then the detector chamber has to be rebuilt. The present parallel-plate design, however, may be constructed in such a manner that it can be easily cleaned if contaminated. In particular, it is possible to embed both the anode and guard strip electrodes into the plastic of their chamber wall support surface (by heating the plastic into a semi-molten state) so that the electrode surfaces are flush with the chamber wall surface and there are no cracks at the edges. This surface, and the other chamber interior surfaces, can therefore be made smooth and free of cracks and crevices which would trap contaminating materials. Thus, if the counter chamber does become contaminated during the course of operation, it can be cleaned by simple washing procedures without having to rebuild the chamber or, in most cases, even remove it from the rest of the detector system. This is an important benefit, since it allows the detector system to be employed with a much wider range of sample materials than might otherwise be risked.

4. Other Performance Issues

The following issues need to be considered when operating either of the preferred embodiments.

Operating Gas and Initial Purging

The electron affinity of the operating gas is preferably small, so that it does not trap the drifting electrons produced in the alpha particle track. In particular, this excludes oxygen and water vapor. While any of the conventional proportional chamber gases could be used, their quenching properties are not required, so that simple inert gases can also be employed. In particular, we have found $N_2$ to be convenient, as it is cheaply available without water vapor contamination as $LN_2$ boil-off gas. We typically operate the chambers in flow mode, purging the chamber for a few minutes at high volume to remove atmospheric $O_2$ and then lowering the flow for the duration of the measurement. $N_2$ is a relatively low-Z gas, which means that it also has a low cross section for environmental gamma rays, muons in cosmic rays, and any beta particle emitters, all of which further contribute to its low background counting rate.

Atmospheric Radon

Since the atmosphere typically contains Ra at about 2.4 pCi/liter or 320 d/1-hr (although this can easily vary by an order of magnitude either way in particular sites), and our chamber volume is typically about 13 liters, we would expect an initial counting rate of about 1.2 alpha particles per second (4200/hour) from this source. [KNOLL-1989, pg. 725] A major advantage of the need to purge the chamber to remove atmospheric $O_2$, therefore, is that the same procedure also flushes the radon and its daughter products from the chamber, excluding those that physically attach to the chamber or sample surfaces.

Sample Placement: Inside or Outside the Chamber

A major operating difficulty with the prior art multi-wire counters arises because they are thin window devices. Since the range of alpha particles in air is quite limited, it becomes a challenge to get the sample very close to the window without tearing or puncturing it. If the window becomes damaged, then the detector often has to be returned to the factory for repair. In the present designs, solid samples can be placed directly inside the chamber, avoiding both alpha particle absorption losses in the atmosphere and the operating anxieties associated with a thin window. The time to purge the chamber, as noted above, is only a few minutes and this can be automated and, in any case, will usually be insignificant compared to the typical 24 hours of counting time required to establish the activity of a very low level sample.

In those cases where the sample would certainly contaminate the chamber, as with powder or liquid samples, it is still possible to make measurements using the preferred embodiment detectors by simply covering the sample with a very thin foil of metallized window material (e.g., aluminized Mylar) and proceeding. Or, indeed, the bottom opening of the detector chamber could be sealed with a window, just as in the prior art case, if this offered a benefit in a particular case. The described method, clearly, does not depend upon whether the sample is physically within the chamber or not.

9. REFERENCES

The following are incorporated by reference:

BROWNE-1999: "Low-background $^3$He Proportional Counters for Use in the Sudbury Neutrino Observatory," M. C. Browne et al. in IEEE Transactions on Nuclear Science, Vol. 46, No. 4, pp. 873–876 (August 1999).

IICO-1999: "Model 1950 Ultra Low Background Alpha Counting System," Product Literature (IICO/Spectrum Sciences, Santa Clara, Calif., 1999).

ITRS-1999: "International Technology Roadmap for Semiconductors, 1999 Edition," (SEMATECH, Austin, Tex., 1999), p. 235.

KNOLL-1989: "Radiation Detection and Measurement, 2nd Ed." by Glenn F. Knoll (J. Wiley, New York, 1989), pp. 131–159 (Chapter 5); pp. 160–198 (Chapter 6), pp. 724–725.

ORTEC-1998: "Introduction to Charged-Particle Detectors" in EG&G Ortec 97/98 Catalog "Modular Pulse-Processing Electronics and Semiconductor Radiation Detectors" (EG&G Ortec, Oak Ridge, Tenn., 1998), pp. 1.8–1.16.

WARBURTON-1999: U.S. Pat. No. 5,873,054, issued Feb. 16, 1999 to W. K. Warburton and Z. Zhou for "Method and apparatus for combinatorial logic signal processor in a digitally based high speed x-ray spectrometer."

10. CONCLUSION

In the foregoing description of specific embodiments we have shown a variety examples of the general technique of active background suppression in an alpha counter whereby, by analyzing the features of the pulses output by the counter, the origins of the alpha particles generating these pulses can be accurately assigned either to the sample or else to some other surface within the counter and hence rejected as background counts. How many of these features would be analyzed in any particular application would depend upon both the design of the detector and what background was required. Some of these features may have been analyzed before, as, for example, pulse amplitude is commonly determined as a method for measuring particle energies. One of the inventive steps taught here is, instead, to use the results of the analysis specifically to determine each alpha particle's point of emission and hence to categorize it as either "signal" or "background."

Therefore, the foregoing description of specific embodiments has been presented for purposes of illustration and description and is not intended to be exhaustive or to limit the invention to the precise forms described, and, obviously, many modifications and variations are possible in light of the above teaching. These embodiments were chosen and described in order to best explain the principles of the invention and its practical application to thereby enable others in the art to best utilize the invention in various embodiments and with such modifications as best suit the invention to the particular uses contemplated.

While the above is a complete description of several specific embodiments of the invention, including methods for exaggerating the differences between pulse features produced by alpha ionization tracks originating in different locations within the detectors, other modifications, alternative constructions, and equivalents may be used.

As a first example, the method could be applied to many existing alpha counters, since their internal geometries are typically not symmetrical and, even operated in proportional mode, they produce recognizable differences between particles originating from different interior locations. The results would probably not be comparable to results from a specifically designed detector, but they might offer a significant improvement over purely passive operation.

As a second example, while we typically measured multiple pulse features, it is clear that in some cases only a single measurement would provide improved background rejection. Thus, in cases where only a limited range of alpha particle energies is present and the drift distance from the sample to the anode is much larger than the drift distance from the backwall to the anode, just a simple pulse amplitude measurement (the simplest "shape" characteristic) would suffice to distinguish between the two cases.

As a third example, the described counters all had rectangular geometries, while cylindrical or, indeed, arbitrary geometries could be employed.

As a fourth example, while the specific embodiments employed digital processing logic to distinguish the source points of detected alpha tracks, all of the described functions could also be implemented using analog processing techniques.

As a fifth example, while we operated our counters as windowless flow counters with initial purging, the invention does not require this. They could also be operated as sealed windowed counters when it was advantageous to do so.

As a sixth example, while the described embodiments were operated with real time processing to distinguish and classify signal traces as they occurred, this is also not necessary. For example, the traces could be digitized and sent to an off-line computer to process and reject those not due to alpha particles emanating from the sample.

As a seventh example, while we have shown a digital processor employing three shaping filters, other numbers of filters could clearly be used. For example, if, to improve noise performance, the peaking time of the fast shaping filter 70 needed to be increased until it approached the value of the slope measuring filter 72, then clearly a single digital filter could serve both functions.

Therefore, the above description should not be taken as limiting the scope of the invention, as defined by the appended claims.

What is claimed is:

1. A method of operating a gas-filled alpha counter, the method comprising:

Providing gas-filled chamber having a sample region, an anode, a preamplifier connected to the anode, and a voltage source;

Using the voltage source to apply a bias such that, whenever an ionization rack is generated by an alpha particle passing through the gas with in the chamber, the electrons in the track are collected by the anode and cause the preamplifier to produce an anode output signal pulse associated with the alpha particle and characteristic of the collection process, a given pulse associated with a given alpha particle being considered to have an associated region of emanation that corresponds to the region within the chamber where the ionization track generated by the given alpha particle originates; and, for at least some pulses:

Measuring one or more features of the pulse that differ depending on the pulses region of emanation; and Determining, based on the measurement of the one or more features, the pulses region of emanation.

2. The method of claim 1, and further comprising classifying the pulse as a background pulse if it is determined that the pulse's associated alpha particle did not emanate from the sample region.

3. The method of claim 1, and further comprising rejecting the pulse as background if it is determined that the pulse's associated alpha particle did not emanate from the sample region.

4. The method of claim 1 wherein said measuring and determining are carried out by analog processing circuitry.

5. The method of claim 1 wherein the preamplifier output signal is conditioned and digitized by an analog-to-digital converter, and said measuring and determining are carried out by a digital computing device.

6. The method of claim 1 wherein the preamplifier output signal is conditioned and digitized by an analog-to-digital converter, and said measuring and determining are carried out by a digital signal processing circuit.

7. The method of claim 6 wherein the digital signal processing circuit comprises a set of combinatorial logic, which carries out measuring operations at the clock speed of the analog-to-digital converter, and a digital computing device, which carries out determining operations at the pulse event rate.

8. The method of claim 1 wherein:

the sample region is a specified region inside the chamber; and the sample material whose alpha emission rate is to be determined is placed within the sample region.

9. The method of claim 8 wherein, if the sample material is capable of migrating within the counter and so contaminating it, the sample material is prevented from doing so by covering it with a piece of material which is thick enough to prevent the migration but thin enough to readily allow the alpha particles to penetrate into the volume of the counter.

10. The method of claim 1 wherein:

the sample region is a region of the chamber adjacent a piece of window material that is thin enough to readily allow alpha particles originating outside the chamber to penetrate through the piece of material into the chamber; and the sample material whose alpha emission rate is to be determined is placed outside of the chamber and is separated from it by the piece of window material.

11. The method of claim 1 wherein the value of the applied bias is adjusted to exaggerate the degree to which the one or more features differ depending on the pulse's region of emanation.

12. The method of claim 11 wherein, for a counter originally designed for operation as a proportional counter, the bias is reduced so that the counter acts as an ionization chamber.

13. The method of claim 11 wherein the voltage applied between the anode and the sample wall is such that the counter operates in the ionization mode.

14. The method of claim 1 wherein the counter is constructed in such a manner as to exaggerate the degree to which the one or more features differ depending on the pulse's region of emanation.

15. The method of claim 14 wherein the degree is exaggerated by constructing said counter so that substantially different electric collection fields are created proximate to different regions of alpha particle emanation.

16. The method of claim 15 wherein:

the anode comprises one or more electrode elements; and the different electric collection fields are produced in the different regions within the counter by placing the electrode elements asymmetrically within the chamber.

17. The method of claim 16 wherein:

the electrode elements are wires; and the voltage applied between the anode and the sample wall is such that the counter operates in the proportional mode.

18. The method of claim 16 wherein:

the electrode elements are wires lying approximately within a plane;

the chamber is bounded in part by two nominally parallel walls, one of which is associated with the sample region, and the plane within which the wires lie is nominally parallel to the walls but is asymmetrically placed in that it is significantly closer to one wall than to the other wall.

19. The method of claim 18 wherein:

the perimeter of the anode wires is enclosed within a guard electrode comprising additional wires lying in approximately the same plane; and signals from the guard electrode are used to determine the region of emanation of alpha particles emitted from the sidewalls of the counter.

20. The method of claim 11 wherein the degree is exaggerated by constructing the counter so that substantially different charge collection distances are created proximate to the different regions of alpha particle emanation.

21. The method of claim 1 wherein the differences between pulse features produced by alpha particles emanating from different regions within the counter are exaggerated by adjusting the counter dimensions so that ionization tracks from the different regions take different amounts of time to be collected, generate different amounts of induced charge in the electrode as they are collected, or both.

22. The method of claim 21 wherein the anode and the sample region are both planes, approximately parallel to each other, and separated by a distance that is significantly longer than the range of the most energetic alpha particles to be found within the chamber.

23. The method of claim 22 wherein the voltage applied between the anode and the sample region is such that the counter operates in the ionization mode.

24. The method of claim 22 wherein:

the perimeter of the anode is surrounded by a guard electrode lying approximately in the same plane as the anode; and signals from the guard electrode are used to determine the region of emanation of alpha particles emitted from the sidewalls of the counter.

25. The method of claim 24 wherein the width of the guard electrode is comparable to the separation between the anode and the sample region in order to increase the electric field uniformity in the volume between the anode and the sample plane.

26. The method of claim 24 wherein the anode and guard electrode are embedded flush within a supporting insulator structure in such a manner that the resulting composite structure is free of cracks and voids and may be easily cleaned to remove such contaminating materials as may accumulate in the course of counter operation.

27. The method of claim 22 wherein an additional field shaping electrode structure is used to increase the electric field uniformity in the volume between the anode and the sample region.

28. The method of claim 22 wherein noise pickup by the anode is reduced by enclosing the chamber within a ground shield.

29. The method of claim 28 wherein the capacitance of the anode is reduced by maintaining separations between the anode and the ground shield that are approximately as large as the distance that separates the anode and the sample region.

30. The method of claim 1 wherein the chamber has sidewalls and further information about an alpha particle's region of emanation is obtained by:

providing a guard electrode in the vicinity of the sidewalls;

coupling an additional preamplifier to the guard electrode;

biasing the guard electrode so that, whenever an alpha particle emanating from one of the sidewalls generates an ionization track, a fraction of the electrons in the track are collected by the guard electrode and cause the additional preamplifier to produce a guard output signal pulse; and for at least some of the measured anode output signal pulses:

also measuring one or more features of the guard output signal pulses from the additional preamplifier that differ depending on the guard output signal pulse's region of emanation; and determining, based on the measurement of the one or more features, whether the associated ionization track emanated from one of the sidewalls.

31. The method of claim 30, and further comprising rejecting as background any alpha particles whose associated ionization tracks are identified as emanating from one of the sidewalls.

32. The method of claim 30 wherein the anode and the guard electrode are operated in anti-coincidence mode so that, whenever the same ionization track produces an output pulse from both preamplifiers, the associated alpha particle is rejected as a background event emanating from one of the sidewalls.

33. The method of claim 30 wherein the one or more features include at least one of the following:

the guard output signal pulse's time of arrival relative to that of the anode output signal pulse; and the final change in the guard output signal pulse's amplitude.

34. The method of claim 31 wherein, for the alpha particle to be rejected, an amount of total charge exceeding a threshold also be collected on the guard electrode.

35. The method of claim 1 wherein the one or more features include both the pulse's duration and its slope divided by its final amplitude.

36. The method of claim 1 wherein the one or more features include the pulse's initial slope.

37. The method of claim 1 wherein the one or more features include both the pulse's duration and its amplitude.

38. The method of claim 1 wherein the one or more features include at least one of the following:

the pulse's duration;

the pulse's amplitude;

the pulse's slope; and the pulse's slope divided by its amplitude.

39. The method of claim 38 wherein the duration is measured by a timer that is gated by a discriminator whose output goes high whenever its input exceeds a preset threshold, where the input to the discriminator is the preamplifier signal filtered by a shaping filter whose time constant is fast compared to a typical pulse risetime.

40. The method of claim 38 wherein the slope is measured by an averaging differentiator filter whose output is captured shortly after the pulse is initially detected.

41. The method of claim 38 wherein the pulse amplitude is measured using a trapezoidal filter whose gap is set to exceed the longest expected pulse 0-to-100% risetime and whose output is captured at a predetermined time after the pulse is initially detected.

42. The method of claim 38 wherein the final pulse amplitude is measured by capturing the value of an averaging filter shortly after the pulse maximum is detected and subtracting from the value an output value of the same averaging filter captured shortly before the pulse is initially detected.

43. The method of claim 1 wherein the background counting rate is further reduced by constructing the alpha counter from materials having low alpha particle emission rates.

44. The method of claim 43 wherein one of the materials having a low alpha particle emission rate is semiconductor grade silicon.

45. The method of claim 1 wherein the gas used in the chamber is nitrogen.

46. The method of claim 45 wherein the alpha counter is purged with nitrogen prior to the start of counting in order to remove radon and its decay products.

47. A gas-filled alpha particle counter comprising:

A gas filled chamber having a sample region;

An anode;

A preamplifier connected to said anode;

A voltage source that applies a bias such that, whenever an ionization track is generated by an alpha particle passing through said gas within said chamber, the electrons in said track are collected by said anode and cause said preamplifier to produce an anode output signal pulse associated with the alpha particle and characteristic of the collection process;

Said chamber and said anode being constructed in such a manner that one or more features of a given pulse differ depending on the region from which the pulse's associated alpha particle emanated; and Primary feature analyzer that measures the one or more features of the pulses from said preamplifier, and determines, based on the measurement of the one or more features information about the region from which the pulse's associated alpha particle emanated.

48. The counter of claim 47, and further comprising means, responsive to a determination by said primary feature analyzer that a given pulse's associated alpha particle did not emanate from the sample region, for rejecting the given pulse as background, thereby reducing the counter's background counting rate.

49. The counter of claim 47 wherein said anode comprises one or more electrode elements that are placed asymmetrically within said chamber so as to produce different electric collection fields in said different regions and thereby produce said significant differences in said pulses.

50. The counter of claim 49 wherein:

said electrode elements are wires lying approximately within a plane;

said chamber is bounded in part by two nominally parallel walls, one of which is associated with said sample region, and said plane within which said wires lie is nominally parallel to said walls but is asymmetrically placed in that it is significantly closer to one of said walls than to the other of said walls.

51. The counter of claim 50, and further comprising:

a guard electrode comprising additional wires lying in approximately the same plane as said anode and enclosing its perimeter;

an additional preamplifier connected to said guard electrode;

an additional voltage source that biases said guard electrode so that said guard electrode collects electrons from ionization tracks and said additional preamplifier produces guard output signal pulses; and a secondary feature analyzer that measures the one or more features of said guard output signal pulses, and determines, based on the measurement of the one or more features, additional information about the region from which the pulse's associated alpha particle emanated.

52. The counter of claim 51, and further comprising means, responsive to a determination by said secondary feature analyzer that a given pulse's associated alpha particle emanated from one of said chamber's sidewalls, for rejecting the given pulse as background, thereby reducing the counter's background counting rate.

53. The counter of claim 47 wherein the counter dimensions are such that ionization tracks from different regions take significantly different amounts of time to be collected, generate significantly different amounts of induced charge in said anode as they are collected, or both, thereby producing said significant differences in said one or more features of said signal pulses.

54. The counter of claim 53 wherein said anode and said sample region are both planes, parallel to each other, and separated by a distance that is significantly longer than the range of the most energetic alpha particles to be found within said chamber.

55. The counter of claim 54 wherein the voltage applied between said anode plane and said sample region plane is such that the counter operates in the ionization mode.

56. The counter of claim 54, and further comprising:
   a guard electrode lying in approximately the same plane as said anode and enclosing its perimeter;
   an additional preamplifier connected to said guard electrode;
   an additional voltage source that biases said guard electrode so that said guard electrode collects electrons from ionization tracks and said additional preamplifier produces guard output signal pulses; and
   a secondary feature analyzer that measures the one or more features of said guard output signal pulses and determines, based on the measurement of the one or more features, additional information about the region from which the guard output pulse's associated alpha particle emanated.

57. The counter of claim 56, and further comprising means, responsive to a determination by said secondary feature analyzer that a given pulse's associated alpha particle emanated from one of said chamber's sidewalls, for rejecting the given pulse as background, thereby reducing the counter's background counting rate.

58. The counter of claim 56 wherein said guard electrode has a width that is comparable to said distance that separates said anode and said sample region, thereby increasing the electric field uniformity in the volume between said anode and said sample region.

59. The counter of claim 56 wherein said primary and secondary pulse feature analyzers operate in anti-coincidence mode so that, whenever the same ionization track produces an output from both preamplifiers, the associated event is rejected as arising from an alpha particle emanating from the sidewalls.

60. The counter of claim 54, and further comprising an additional field shaping electrode structure that increases the electric field uniformity in the volume between said anode and said sample region.

61. The counter of claim 54, and further comprising a ground shield that encloses said chamber that reduces noise pickup by said anode.

62. The counter of claim 47 wherein said pulse feature analyzer includes means for determining one or more of the following:
   the pulse's duration;
   the pulse's amplitude;
   the pulse's slope; and
   the pulse's slope divided by its amplitude.

63. The counter of claim 47 wherein said primary pulse feature analyzer determines pulse duration using:
   a shaping filter, whose time constant is significantly shorter than that of a typical pulse risetime;
   a discriminator whose output goes high whenever its input from said shaping filter exceeds a preset threshold; and
   a timer that is gated by the output of said discriminator.

64. The counter of claim 47, and further comprising:
   an analog-to-digital converter to digitize said preamplifier output signal; and
   a digital signal processing circuit implementing said pulse feature analyzer.

65. The counter of claim 64 wherein said digital signal processing circuit comprises:
   a set of combinatorial logic, which carries out pulse feature analysis operations at the clock speed of said analog-to-digital converter; and
   a digital computing device, which carries out pulse feature analysis operations at the pulse event rate.

66. The counter of claim 47 wherein said primary pulse feature analyzer determines slope using:
   an averaging differentiation filter; and
   means for capturing said filter's output shortly after the pulse is initially detected.

67. The counter of claim 47 wherein said primary pulse feature analyzer determines pulse amplitude using:
   a trapezoidal filter whose gap is set to exceed the longest expected pulse 0-to-100% risetime; and
   means for capturing said filter's output at a predetermined time after the pulse is initially detected.

68. The counter of claim 47, and further comprising:
   an analog-to-digital converter to digitize said preamplifier output signal; and
   a digital computing device implementing said pulse feature analyzer.

69. The counter of claim 47 wherein materials having low alpha particle emission rates are used to construct the counter to further reduce a background counting rate.

70. The counter of claim 47 wherein the gas used in said chamber is nitrogen.

71. The counter of claim 70 wherein the counter is purged with nitrogen prior to the start of counting in order to remove radon and its decay products.

72. The counter of claim 47 wherein the sample material whose alpha emission rate is to be determined is placed within a specified region inside of said chamber.

73. The counter of claim 47 wherein the sample material whose alpha emission rate is to be determined is placed outside of said chamber and is separated from it by a piece of material which is thin enough to readily allow said alpha particles to penetrate into the volume of the counter.

74. A method of operating a gas-filled alpha counter that includes a gas-filled chamber having a sample region, an anode, a preamplifier connected to the anode, and a voltage source that applies a bias such that, whenever an ionization track is generated by an alpha particle passing through the gas within the chamber, the electrons in the track are collected by the anode and cause the preamplifier to produce an anode output signal pulse associated with the alpha particle and characteristic of the collection process, a given pulse associated with a given alpha particle being considered to have an associated region of emanation that corresponds to the region within the chamber where the ionization track generated by the given alpha particle originates, the method comprising, for at least some pulses:
   measuring one or more features of the pulse that differ depending on the pulse's region of emanation; and
   determining, based on the measurement of the one or more features, the pulse's region of emanation.

* * * * *